US012206800B1

(12) United States Patent
Miseiko et al.

(10) Patent No.: US 12,206,800 B1
(45) Date of Patent: Jan. 21, 2025

(54) EVENT-DRIVEN ASSESSMENT OF NETWORK SYSTEM ASSETS

(71) Applicant: Rapid7, Inc., Boston, MA (US)

(72) Inventors: Paul Miseiko, Mississauga (CA); Leonardo Varela, Austin, TX (US)

( * ) Notice: Subject to any disclaimer, the term of this patent is extended or adjusted under 35 U.S.C. 154(b) by 255 days.

(21) Appl. No.: 17/878,168

(22) Filed: Aug. 1, 2022

Related U.S. Application Data

(63) Continuation-in-part of application No. 17/808,078, filed on Jun. 21, 2022, which is a continuation-in-part of application No. 17/808,079, filed on Jun. 21, 2022, which is a continuation-in-part of application No. 17/808,081, filed on Jun. 21, 2022.

(51) Int. Cl.
| | | |
|---|---|---|
| *H04L 9/00* | (2022.01) | |
| *H04L 9/32* | (2006.01) | |
| *H04L 9/40* | (2022.01) | |
| *H04L 9/08* | (2006.01) | |

(52) U.S. Cl.
CPC .......... *H04L 9/3268* (2013.01); *H04L 63/108* (2013.01); *H04L 63/1408* (2013.01); *H04L 9/32* (2013.01); *H04L 63/00* (2013.01); *H04L 63/1433* (2013.01)

(58) Field of Classification Search
CPC ......... H04L 9/3268; H04L 9/32; H04L 63/00; H04L 63/108; H04L 63/1408; H04L 63/1433
See application file for complete search history.

(56) References Cited

U.S. PATENT DOCUMENTS

| | | |
|---|---|---|
| 7,609,650 B2 | 10/2009 | Roskowski et al. |
| 8,955,038 B2 | 2/2015 | Nicodemus et al. |
| 9,503,472 B2 | 11/2016 | Laidlaw et al. |
| 9,634,951 B1 | 4/2017 | Hunt et al. |
| 9,954,883 B2 | 4/2018 | Ahuja et al. |
| 2008/0155086 A1* | 6/2008 | Jensen ................ H04L 67/1012 709/223 |
| 2010/0175134 A1* | 7/2010 | Ali-Ahmad ............. G06F 3/048 726/25 |

(Continued)

OTHER PUBLICATIONS

"Remote Scan Enterprise and Remote Scan Universal"—Quest Software, Inc., Aug. 2019 https://www.quest.com/documents/remotescan-enterprise-support-guide-datasheet-112378.pdf (Year: 2019).*

(Continued)

*Primary Examiner* — Randy A Scott
(74) *Attorney, Agent, or Firm* — Ashwin Anand; Lei Sun

(57) ABSTRACT

A method for asset assessment is provided. The method includes receiving, by a scan engine, an event message from a scan assistant associated with an asset of a network system. The asset includes at least one computing resource. The event message includes an indication of one or more events associated with the asset. The method also includes responsive to receiving the event message, transmitting, by the scan engine, a request to the scan assistant for executing one or more scan operations on the asset and to determine a state of the asset based on at least one of an amount of available network resources or a schedule associated with the asset. The method further includes executing, by the scan engine, the one or more scan operations on the asset after transmitting the request.

20 Claims, 10 Drawing Sheets

(56) References Cited

U.S. PATENT DOCUMENTS

2012/0216190 A1* 8/2012 Sivak ................... G06F 21/562
718/1
2016/0044057 A1 2/2016 Chenette et al.
2019/0036911 A1* 1/2019 Bell .................... H04L 63/1433
2019/0052666 A1* 2/2019 Muthurajan ........ H04L 63/1433

OTHER PUBLICATIONS

"Cloud Agent vs. Authenticated Scan Detection"—Qualys Support, Aug. 29, 2022 https://success.qualys.com/support/s/article/000003574 (Year: 2022).*

* cited by examiner

EVENT-DRIVEN ASSESSMENT OF NETWORK SYSTEM ASSETS

CROSS-REFERENCE TO RELATED APPLICATIONS

This application is a continuation in part (CIP) of and claims priority to U.S. Patent Application Serial Nos. (1) Ser. No. 17/808,078, filed Jun. 21, 2022, titled "Authenticated Assessment of Network System Assets", (2) Ser. No. 17/808,079, filed Jun. 21, 2022, titled "Policy Exceptions for Assessing Network System Assets, and (3) Ser. No. 17/808,081, filed Jun. 21, 2022, titled "Signed Remote Execution for Assessment of Network System Assets", which are hereby incorporated by reference in their entirety.

TECHNICAL FIELD

This disclosure is related to network computing systems. In particular, this disclosure is related to assessing assets of a network computing system.

BACKGROUND

Authenticated scans provide insight into a state of an asset on a network system. These scans may require an owner of the network to create, manage, and distribute credentials in order to implement and use these scans. This may create network challenges and may often require integration with third-party credential services. For example, authenticated scan credentials may require administrative (e.g., WINDOWS®)/root (e.g., UNIX®) access to effectively authenticate a scan and thereby complicate acceptance to deploy credentials.

In some aspects, remote execution of commands on an asset of a network system to perform assessment of that asset may require authentication of a remote device. WinRM® on WINDOWS®, OpenSSH® on UNIX®, and similar systems may be used to achieve remote access. However, if a credential used by a remote device for authenticated access becomes comprised, the credential may be used to provide or obtain unfettered access to the asset. In some aspects, customers may want continuous updates on a risk of their assets. However, customer may be left with receiving updates only when an ad-hoc assessments or a scheduled assessments runs. In some cases, when a customer remediates risk, an assessment to verify that the risk was remediated may be run.

SUMMARY OF EMBODIMENTS

Disclosed herein are methods, systems, and apparatuses for implementing authenticated assessment of a network system asset. Embodiments described herein utilize a scan assistant implemented with an asset of a network system to authenticate a scan engine for performing a scan assessment of the asset. The scan assistant may allow network system owners to authenticate a scan engine on a device without using credentials from third-party credential management software and bypassing network system owner concerns when creating an administrative level credential or a root level credential for access. In some aspects, a scan assistant monitors events associate with an asset and interacts with a scan engine to trigger an asset assessment when the scan assistant detects an event associated with the asset.

Figure 1:
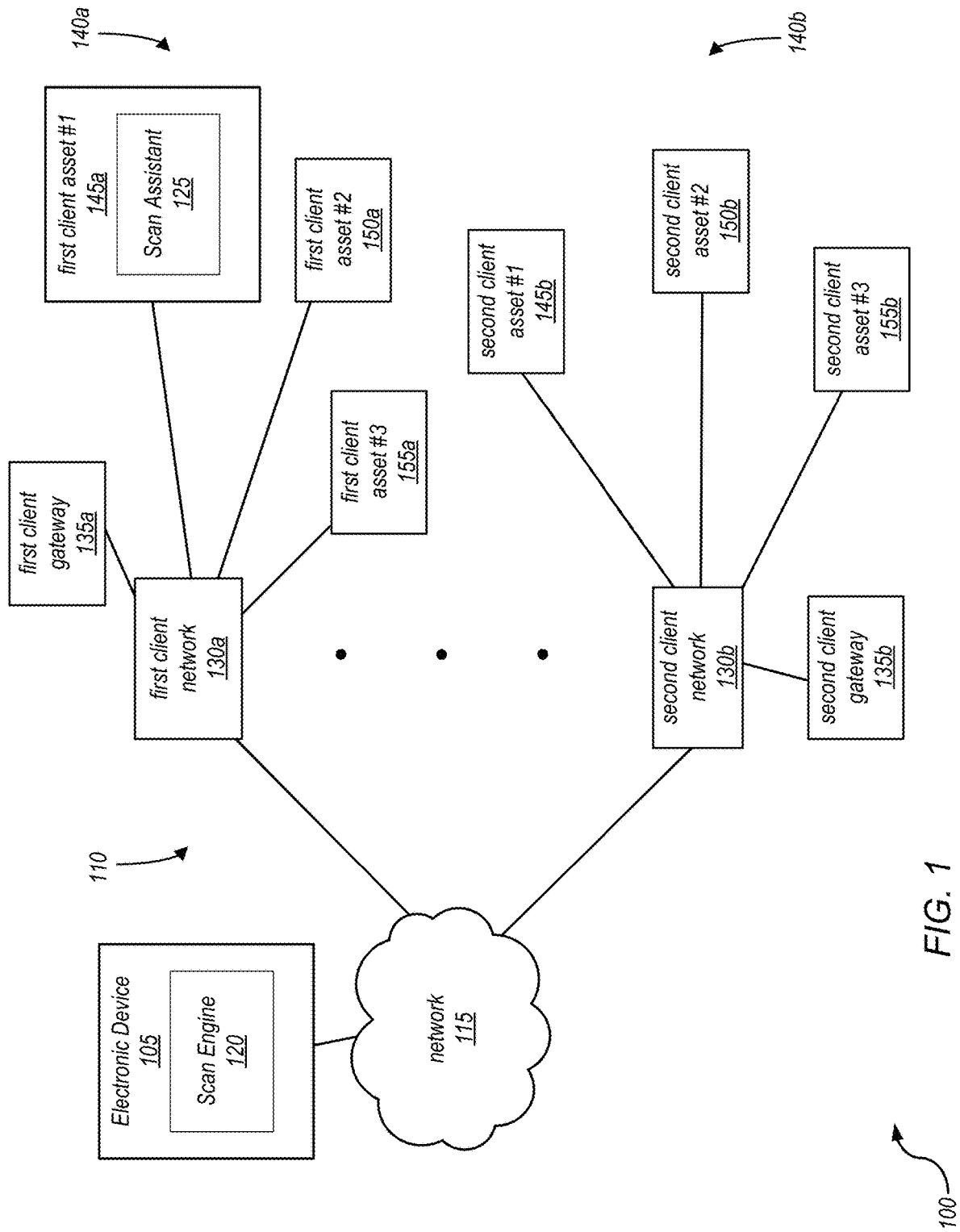
FIG. 1 illustrates of an example diagram of a scan engine and a client asset according to some aspects.

While the disclosure is open to various modifications and alternative implementations, specific embodiments of the disclosure are provided as examples in the drawings and detailed description. It should be understood that the drawings and detailed description are not intended to limit the disclosure to the particular form disclosed.

DETAILED DESCRIPTION

Authenticated scans provide insight into a state of an asset on a network system. These scans may require an owner of the network to create, manage, and distribute credentials in order to implement and use these scans. This may create network challenges and may often require integration with third-party credential services. For example, authenticated scan credentials may require administrative (e.g., WINDOWS®)/root (e.g., UNIX®) access to effectively authenticate a scan and thereby complicate acceptance to deploy credentials.

In some aspects, remote execution of commands on an asset of a network system to perform assessment of that asset may require authentication of a remote device. WinRM® on WINDOWS®, OpenSSH® on UNIX®, and similar systems may be used to achieve remote access. However, if a credential used by a remote device for authenticated access becomes comprised, the credential may be used to provide or obtain unfettered access to the asset.

In some aspects, policy scans may use administrative credentials to remotely authenticate with several network services running on an asset of a network system. Policy benchmarks may require that remote access of any kind is not allowed, remote access with administrative credentials is not allowed, or network services required for policy scanning must not be running. To avoid this issue, a network system owner may implement exceptions to their policy assessment results that override a non-compliant status of a policy test that conflicts with policy scanning requirements. As a result, a network system owner may be left temporarily non-compliant, if the network system owner overrides the non-compliant status prior to scanning or the network system owner may be left permanently non-compliant if the network system owner keeps their assets configured with an exception. In many cases, having an asset in a non-compliant state increases the risk of compromising an asset or the network system.

FIG. 1 illustrates an example network computing system 100 according to some aspects. The network computing system 100 may be for performing scans of one or more assets. As shown in FIG. 1, the network computing system 100 may include an electronic device 105 in electronic communication with one or more client networks 110 via the network 115. The electronic device 105 may include a scan engine 120 for performing one or more scan operations of an asset of a client network. In some aspects, the one or more client networks 110 may include at least a first client network 130a and a second client network 130b. The first client network 130a may include a first client gateway 135a controlling electronic communication traffic into and out of the first client network 130a. The first client network 130a may also include one or more first client assets 140a. For example, the one or more first client assets 140a may include a first client asset #1 145a, a first client asset #2 150a, and a first client asset #3 155a. Similarly, the second client network 130b may include a second client gateway 135b controlling electronic communication traffic into and out of the second client network 130b. The second client network 130b may also include one or more second client assets 140b. For example, the one or more second client assets 140b may include a second client asset #1 145b, a second client asset #2 150b, and a second client asset #3 155b.

For at least the first client network 130a of the one or more client networks 110, at least the first client asset #1 145a may include a scan assistant 125. The scan assistant 125 may shift the challenge from credentials to software and advancing the perception that software management is easier for customers from both a technical and psychological perspective. The scan assistant 125 may function on each asset and answers questions of an authenticated scan without the need to create, manage, or distribute credentials. The scan assistant 125 may provide encrypted communication with modern authentication which is an improvement on some assets. In some cases, the scan assistant may provide an asynchronous API that enables simultaneous inflight questions.

In some aspects, the scan assistant 125 may use of TLSv1.2 with 2-way client certificate authentication (to be upgraded to TLSv1.3 when applicable). The scan engine 120 may not verify the scan assistant 125 (e.g., a server side certificate). The scan assistant 125 may verify a scan engine certificate or a private certificate. In other words, the scan assistant 125 described herein may utilize 2-way client certificate authentication with a reversed one-way methodology. The scan engine 120 may have access to the private key associated with the client certificate, while the scan assistant 125 may be deployed with the public key associated with the client certificate. This situation may solve a critical problem when private material is used and the client should not know the secret material required to access other clients. This decision simplifies deployment since customers only have to distribute one certificate, instead of two. Furthermore, the scan assistant service may generate a new server side certificate each time it starts reducing the risk of a server side certificate compromise.

Furthermore, scan assistant 125 may utilize a pure binary protocol, a pure HTTP protocol with text based content encapsulation such as Json or XML, and a hybrid HTTP protocol with binary based content encapsulation. A pure binary protocol may be about five times more efficient (reduced CPU load) on the scan target over the HTTP protocol when the equivalent of a zero resistance load was applied to the system (a request with no functional handler). This allowed the scan assistant 125 to service 250,000 requests per second with the binary protocol versus 50,000 requests per second with the HTTP protocol. However, in real-world scenarios, most of the scan assistants 125 time may be spent in the handler of a request and in real-world tests the pure binary protocol was about two times more efficient. A conclusion may be to use the HTTP protocol with a hybrid binary based content encapsulation. The HTTP protocol may be easier to understand and maintain versus a binary protocol, and the long term engineering costs of a pure binary protocol may not merit the additional efficiencies it offers. To avoid complications with different encoding schemes and internationalization, a binary based content encapsulation may be used where data on the scan assistant is serialized into bytes and the client must decode those bytes into the appropriate encoding scheme. The HTTP protocol may maintain communication channel integrity with a combination of the "Content-Length" field when responses are small, and "Chunked Transfer Encoding" when the response are large. This may keep the protocol from being desynchronized between the client and server, as may happen with some pure binary protocols, while maintaining a very small memory footprint when moving large amounts of data e.g., when the client requests to read a large file.

In some aspects, authenticated scan credentials may need administrative access to be most effective which may complicate acceptance from customers to deploy such credentials. A scan agent, instead of using credentials for an authenticated scan, may be used to communicate over the transport layer security (TLS) protocol. This may allow customers to manager an agent and it's configuration (TLS/TLS-PSK trust material such as certificates or a shared secret). This may also bypass challenges customers may experience when using credentials such as with third party credential management software (CYBERARK®). This may also bypass concerns customers may have when creating an administrative/root level credential for remote access. The scan agent may runs as a service on the system and may provide an API for the scan engine to assess the asset as if the scan engine had administrative/root credentials without such credentials. The WINDOWS® CIFS protocol may not be encrypted and when an asset is scanned all collected data sensitive or otherwise may be transmitted over the wire as unencrypted (e.g., plain text) data. The WINDOWS® CIFS protocol may be the most common protocol used to scan and assess WINDOWS® assets in our industry. The latest version of SMB (also known as CIFS) may support encryption but may not be commonly deployed or used by some scan engines.

In some aspects, some systems may use existing protocols offered to solve the problem of authenticated asset assessment. This includes OpenSSH® in UNIX and CIFS/WMI/WinRM in WINDOWS®. As described herein, instead of offering up an agent based solution, not to be confused with an INSIGHT® platform or INSIGHT® agent, that provides a secure high performance method for scan engines to perform an authenticated assessment of an asset.

The scan assistant, described herein, may provide customers with a secure alternative for authenticated scans that uses elliptic curve asymmetric encryption (ECDSA) and advanced encryption standard (AES) to establish a trusted secure channel between the scan engine and scan assistant. The customer may deploy the scan assistant with a public certificate in their environment and the scan engine may be given a private certificate. The scan assistant may be light weight and may be idle unless it is being scanned. The scan assistant may communicate with the scan engine using TLSv1.2 with two-way client certificate authentication (to be upgraded to TLSv1.3 when applicable). The scan engine may not verify the certificate of the scan assistant (e.g., on a server side). The scan assistant may verify the scan engine certificate (the scan engine is the client in this scenario). This effectively may means that the system uses two-way client certificate authentication with a reversed one-way methodology. The scan engine may have access to the private key associated with the client certificate, while the scan assistant may be deployed with the public key associated with the client certificate. The system may solve a critical problem when private material is used (e.g., a client should not know the secret material required to access other clients). This may simplify deployment since customers only have to distribute one certificate, instead of two. Furthermore, the scan assistant service may generate a new server side certificate each time the scan assistant starts reducing the risk of a server side certificate compromise.

Figure 2:
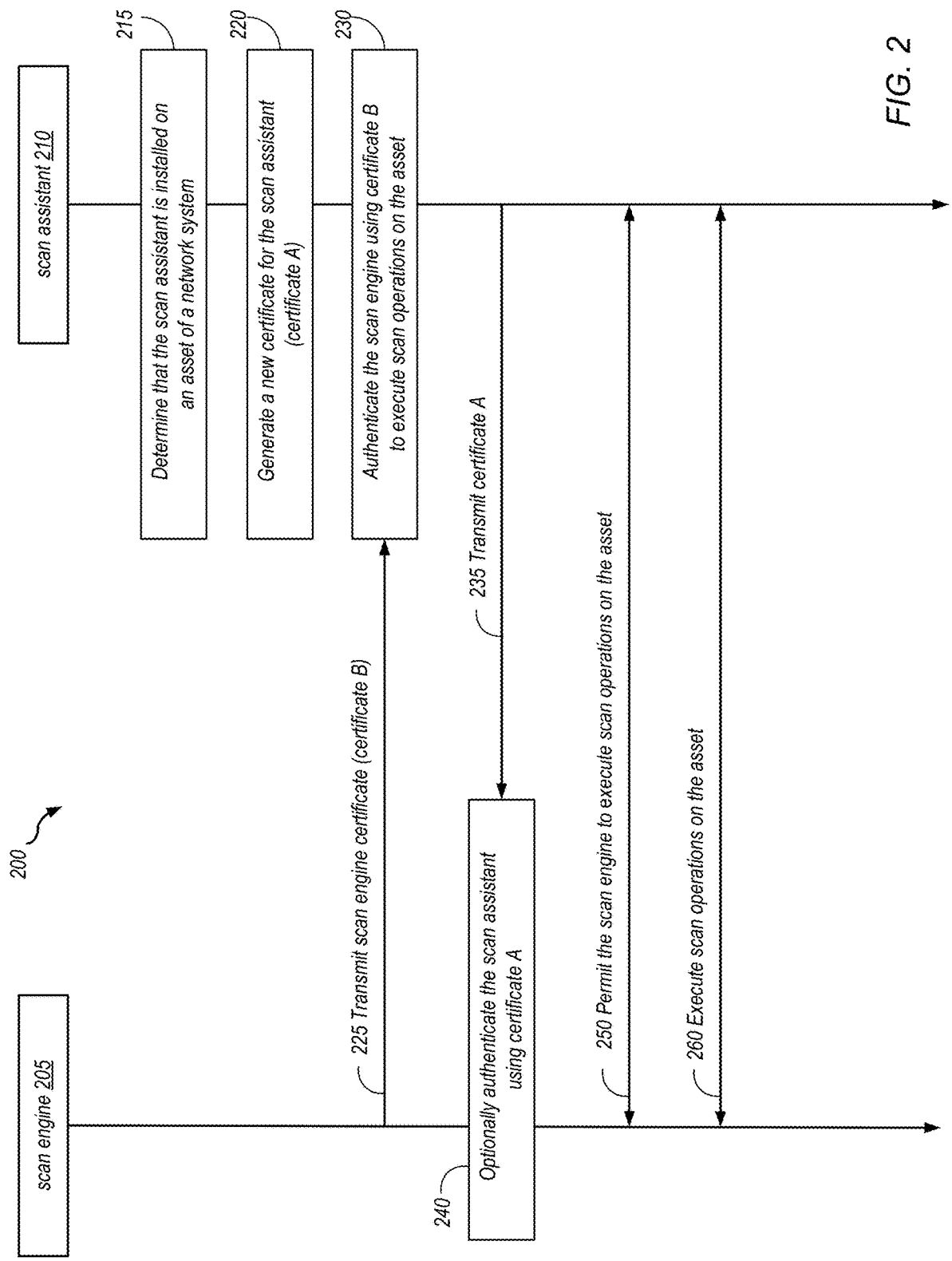
FIG. 2 illustrates an example system for performing asset assessment on an asset according to some aspects.

FIG. 2 illustrates an example system 200 for performing asset assessment on an asset according to some aspects. The example system 200 may include a scan engine 205 and a scan assistant 210. The scan engine 205 may be the same as or at least similar to the scan engine 120 illustrated in FIG. 1. For example, the scan engine 205 may be located on an electronic device as described herein. The scan assistant 210 may be the same as or at least similar to the scan assistant 125 illustrated in FIG. 1. For example, the scan assistant 210 may be for installation on an asset such as a client asset as described herein.

At operation 215, the scan assistant 210 may receive an indication that the scan assistant 210 is installed on an asset of a network system. For example, the scan assistant 210 may receive an indication that the scan assistant 210 is installed on an asset of a network system in response to installing the scan assistant 210 on the asset of the network system. As another example, the scan assistant 210 may receive an indication that the scan assistant 210 is installed on an asset of a network system when the asset of the network system is powered on or activated for operation.

At operation 220, the scan assistant 210 may generate a public certificate for authenticating the scan engine 205 to execute one or more scan operations on the asset. For example, the scan assistant 210 may generate a public certificate for authenticating the scan engine 205 to execute one or more scan operations on the asset after (e.g., in response to) receiving the indication that the scan assistant 210 is installed on the asset of the network system. As another example, the scan assistant 210 may generate a public certificate for authenticating the scan engine 205 to execute one or more scan operations on the asset after (e.g., in response to) receiving a private certificate from the scan engine 205 as described further herein.

At operation 225, the scan assistant 210 may receive a private certificate from the scan engine 205. The scan assistant 210 may receive a private certificate from the scan engine 205 for determining a state of the asset. The asset may include at least one computing device. In some aspects, the private certificate may be generated by the scan engine 205 for authentication with the scan assistant 210 for the scan engine 205 to execute the one or more scan operations of the asset. Alternatively, the private certificate may be stored with the scan engine 205 during installation of the scan engine 205 on the electronic device for subsequent use by the scan engine 205, for example, with the scan assistant 210. The scan engine 205 may transmit the private certificate to the scan assistant 210 so that the scan assistant 210 may perform one-way authentication of the scan engine 205 to perform one or more scan operations on the asset. In some aspects, as described herein, the scan assistant 210 may generate the public certificate for authenticating the scan engine 205 to execute one or more scan operations on the asset after (e.g., in response to) receiving a private certificate from the scan engine 205.

At operation 230, the scan assistant 210 may verify that private certificate and the public certificate are a matching public-private certificate pair. For example, upon receiving the private certificate from the scan engine 205, the scan assistant 210 may compare the private certificate with a public certificate to determine whether the public certificate and the private certificate are a matching public-private certificate pair. If the public certificate and the private certificate are a matching public-private certificate pair, the scan assistant 210 may authenticate the scan engine 205 to execute one or more scan operations on the asset. If the public certificate and the private certificate are not a matching public-private certificate pair, the scan assistant 210 may prohibit or prevent the scan engine 205 from executing one or more scan operations on the asset.

At operation 230, the scan assistant 210 may authenticate the scan engine 205 with the scan assistant 210 to execute the one or more scan operations on the asset. For example, upon receiving the private certificate from the scan engine 205, the scan assistant 210 may compare the private certificate with a public certificate and determine or verify that the public certificate and the private certificate are a matching public-private certificate pair. Based on determining or verifying that the public certificate and the private certificate are a matching public-private certificate pair, the scan assistant 210 may authenticate the scan engine 205 to execute one or more scan operations on the asset.

At operation 250, the scan assistant 210 may permit the scan engine 205 to execute the one or more scan operations on the asset. For example, upon receiving the private certificate from the scan engine 205, the scan assistant 210 may compare the private certificate with a public certificate and determine or verify that the public certificate and the private certificate are a matching public-private certificate pair. Based on determining or verifying that the public certificate and the private certificate are a matching public-private certificate pair, the scan assistant 210 may authenticate the scan engine 205 to execute one or more scan operations on the asset. After the scan assistant 210 authenticates the scan engine 205 to execute the one or more scan operations on the asset, the scan engine 205 may receive permission from the scan assistant 210 to execute the one or more scan operations on the asset. In some aspects, the scan engine 205 may receive an electronic message from the scan assistant 210 indicating that the scan engine 205 has permission to execute one or more scan operations on the asset. In some aspects, the scan assistant 210 may provide access for the scan engine 205 to execute the one or more scan operations on the asset.

At operation 260, the scan engine 205, in cooperation with the scan assistant 210, may execute the one or more scan operations on the asset. For example, after the scan engine 205 receives permission from the scan assistant 210 to execute the one or more scan operations on the asset, the scan engine 205 may execute at least one of one or more commands or one or more scripts on the asset.

In some aspects, after the scan assistant 210 authenticates the scan engine 205 with the scan assistant 210 to execute the one or more scan operations on the asset and after the scan engine 205, in cooperation with the scan assistant 210, executes the one or more scan operations on the asset, the scan assistant 210 may determine that the scan engine 205 may remain authenticated to execute additional scan operations on the asset. Alternatively, in some aspects, after the scan engine 205, in cooperation with the scan assistant 210, executes the one or more scan operations of the asset, the scan assistant 210 may determine that the scan engine 205 is no longer authenticated with the scan assistant 210 to execute additional scan operations on the asset without performing another authentication procedure.

At another operation, the scan assistant 210 may generate another public certificate for authenticating the scan engine 205 to execute one or more additional scan operations on the asset. The other public certificate may be a different public certificate than the public certificate generated by the scan assistant 210 at operation 220. Alternatively, in some aspects, the scan assistant 210 may utilize the public certificate previously generated in operation 220 for authenticating the scan engine 205 to execute the one or more additional scan operations on the asset. This operation may have one or more same or similar features as operation 220 described herein.

At another operation, the scan engine 205 may transmit the private certificate to the scan assistant 210 and the scan assistant 210 may receive the private certificate from the scan engine 205. The scan engine 205 may transmit the private certificate to the scan assistant 210 and the scan assistant 210 may receive the private certificate from the scan engine 205 for determining a state of the asset. The asset may include at least one computing resource. The private certificate from the scan engine 205 may be the same private certificate transmitted by the scan engine 205 at operation 225. Alternatively, the private certificate may be a newly generated private certificate generated by the scan engine 205, for example, so that the scan engine 205 may authenticate with the scan assistant 210 for obtaining permission from the scan assistant 210 to execute the one or more additional scan operations on the asset. This operation may have one or more same or similar features as operation 225 described herein.

At another operation, the scan assistant 210 may verify that the private certificate and the public certificate are a matching public-private certificate pair. Operation 260 may have one or more same or similar features as operation 230 described herein. At another operation, the scan assistant 210 may authenticate the scan engine 205 with the scan assistant 210 to execute the one or more additional scan operations on the asset. This operation may have one or more same or similar features as operation 235 described herein.

At another operation, the scan assistant 210 may permit the scan engine 205 to execute the one or more additional scan operations on the asset. This operation may have one or more same or similar features as operation 250 described herein. At another operation, the scan engine 205, in cooperation with the scan assistant 210, may execute one or more additional scan operations on the asset. This operation may have one or more same or similar features as operation 260 described herein.

In some aspects, customers may want continuous updates on a risk of their assets. However, customer may be left with receiving updates only when an ad-hoc assessments or a scheduled assessments runs. In some cases, when a customer remediates risk, an assessment to verify that the risk was remediated may be run. A scan assistant on an asset monitors for events such as software and/or patch installation or configuration changes. When one or more event(s) occur that meet the criteria, the scan assistant may signal a scan engine, console, an administrator platform, or some other component that an assessment is needed. The signal may be acted upon immediately, queued, or delayed as needed by the system or by a customer described configuration. Near continuous updates may be provided on the risk of the assets without the need to run ad-hoc assessments, configure scheduled assessments, or run remediation assessments.

In some aspects, if the system does not have sufficient resources to process a signal immediately that signal may be queued and the customer will have metrics on the size of the queue and estimated time for queue completion. If the system has sufficient resources, but the customer does not want assessments within the current window of time, the assessment may be queued until assessments of that asset are permitted as per the customer's described configuration. If the system has sufficient resources but the asset is producing a lot of events, the system may defer assessment until the event stream is complete, such as, for example, if a customer is installing multiple patches, or making multiple configuration changes. A delay may minimize a number of assessments that need to run by allowing multiple events to be coalesced into a single assessment. This may minimize asset resource utilization, network utilization, and assessment resources. A delay should be within a reasonable amount of time to minimize the delay in reporting risk to the customer.

Figure 3:
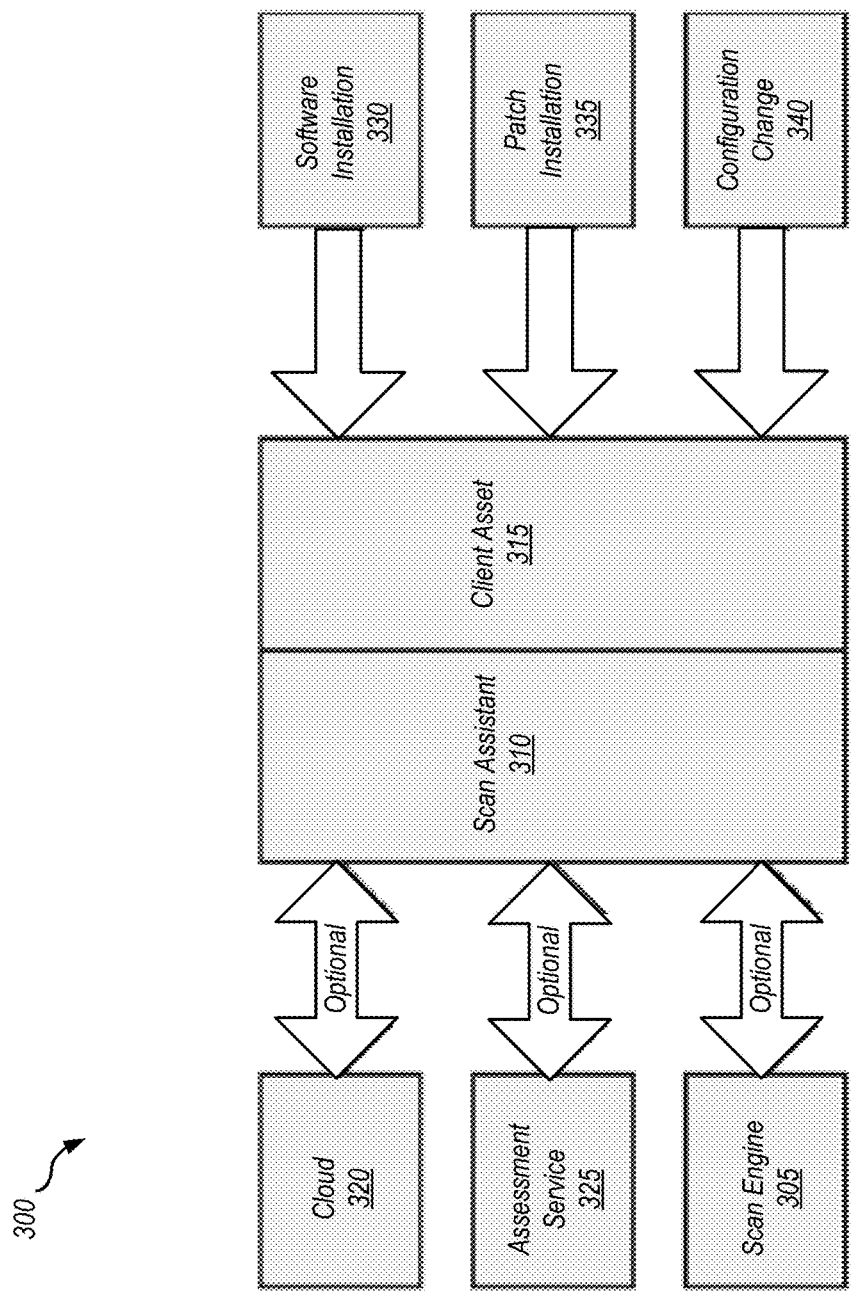
FIG. 3 illustrates an example network computing system for asset assessment according to some aspects.

FIG. 3 illustrates an example network computing system 300 for asset assessment according to some aspects. The example network computing system 300 may include a scan engine 305, a scan assistant 310, a client asset 315, a cloud system 320, an assessment service device 325, a software installation device 330, a patch installation device 335, and a configuration change device 340. The network computing system 300 may implement event driven asset assessment as described herein. For example, as shown in FIG. 3, the scan assistant 310 may detect that an event is occurring or is about to occur involving the client asset 315. In some aspects, the event may be a software installation from the software installation device 330 and on the client asset 315. Additionally, or alternatively, the event may be a patch installation from the patch installation device 335 and on the client asset 315. Additionally, or alternatively, the event may be a configuration change of the client asset 315 implemented by the configuration change device 340. Upon detecting that the event is occurring or is about to occur, the scan assistant may transmit a signal to the scan engine 305 to execute one or more operations on the client asset 315. In some aspects, the scan engine 305 may utilize the cloud system 320 and the assessment service device 325 to assistant in executing the one or more scan operations of the client asset 315. In some aspects, the scan engine 305 may execute the one or more scan operations before the event occurs on the client asset 315, while the event occurs on the client asset 315, and/or after the event occurs on the client asset 315.

Figure 4:
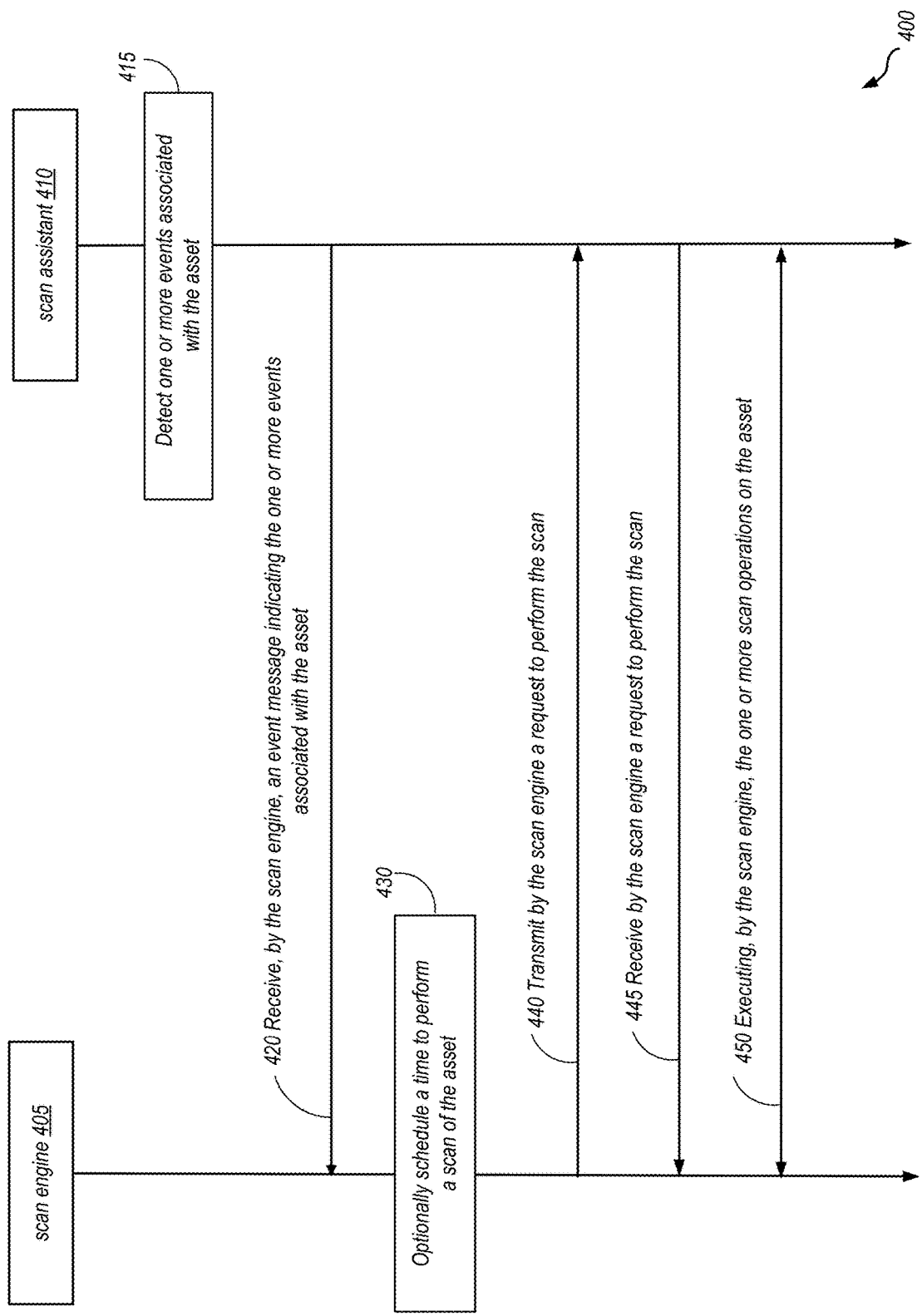
FIG. 4 illustrates an example system for event driven asset assessment according to some aspects.

FIG. 4 illustrates an example system 400 for performing event driven asset assessment according to some aspects. The example system 400 may include a scan engine 405 and a scan assistant 410. The scan engine 405 may be the same as or at least similar to the scan engine 120 illustrated in FIG. 1, the scan engine 205 illustrated in FIG. 2, and the scan engine 305 illustrated in FIG. 3. For example, the scan engine 405 may be located on an electronic device as described herein. The scan assistant 410 may be the same as or at least similar to the scan assistant 125 illustrated in FIG. 1, the scan assistant 210 illustrated in FIG. 2, and the scan assistant 310 illustrated in FIG. 3. For example, the scan assistant 410 may be for installation on an asset such as a client asset 315 of FIG. 3 as described herein.

At operation 415, the scan assistant 410 may receive an indication that the scan assistant 410 is installed on an asset of a network system. For example, the scan assistant 410 may receive an indication that the scan assistant 410 is installed on an asset of a network system in response to installing the scan assistant 410 on the asset of the network system. As another example, the scan assistant 410 may receive an indication that the scan assistant 410 is installed on an asset of a network system when the asset of the network system is powered on or activated for operation.

At operation 420, the scan assistant 410 may detect one or more events associated with the asset. For example, the scan assistant 410 may detect that an event is occurring or is about to occur involving an associated asset. In some aspects, the event may be a software installation on the asset. Additionally, or alternatively, the event may be a patch installation on the asset. Additionally, or alternatively, the event may be a configuration change of the asset. In some aspects, the scan assistant 410 may detect that the one or more events are about to occur, that the one or more events are in the process of occurring, and/or that the one or more events have finished occurring.

At operation 425, the scan assistant 410 may transmit, to the scan engine 405, an event message indicating an occurrence of the one or more events associated with the asset. In some aspects, the scan assistant 410 may transmit, to the scan engine 405, an event message indicating that the one or more events are about to occur, that the one or more events are currently occurring, and/or that the one or more events having finished occurring. In some aspects, the scan assistant may detect that the one or more events are about to occur and/or are currently occurring and wait until the one or more events have occurred before transmitting the event message to the scan engine 405.

In some aspects, the event message may including an indication of an available time and/or a preferred time for the scan engine 405 to executing one or more scan operations on the asset. For example, the asset may have a processing schedule that is very busy or an availability schedule the prohibits scanning at one or more specified times. In this case, the event message may include an indication of one or more times that the asset is available for scanning based on the processing schedule or availability schedule. In some aspects, the event message may include an indication of one or more schedules of one or more other assets that may be scheduled to interact with the asset associated with the scan assistant 410. Based on the event message, the scan engine 405 may determine when the scan engine 405 can send a private certificate to the scan assistant 410 and when the asset is available for the scan engine 405 to perform one or more scan operations for asset assessment as described herein.

At operation 435, the scan assistant 410 may generate a public certificate for authenticating the scan engine 405 to execute one or more scan operations on the asset. The scan assistant 410 may generate a public certificate for authenticating the scan engine 405 to execute one or more scan operations on the asset and for determining a state of the asset. The asset may include at least one computing resource. For example, the scan assistant 410 may generate a public certificate for authenticating the scan engine 405 to execute one or more scan operations on the asset after (e.g., in response to) receiving the indication that the scan assistant 410 is installed on the asset of the network system. As another example, the scan assistant 410 may generate a public certificate for authenticating the scan engine 405 to execute one or more scan operations on the asset after (e.g., in response to) receiving a private certificate from the scan engine 405 as described further herein.

At operation 440, the scan assistant 410 may receive a private certificate from the scan engine 405. In some aspects, the private certificate may be generated by the scan engine 405 for authentication with the scan assistant 410 for the scan engine 405 to execute the one or more scan operations of the asset. Alternatively, the private certificate may be stored with the scan engine 405 during installation of the scan engine 405 on the electronic device for subsequent use by the scan engine 405, for example, with the scan assistant 410. The scan engine 405 may transmit the private certificate to the scan assistant 410 so that the scan assistant 410 may perform one-way authentication of the scan engine 405 to perform one or more scan operations on the asset. In some aspects, as described herein, the scan assistant 410 may generate the public certificate for authenticating the scan engine 405 to execute one or more scan operations on the asset after (e.g., in response to) receiving a private certificate from the scan engine 405.

At operation 445, the scan assistant 410 may verify that private certificate and the public certificate are a matching public-private certificate pair. For example, upon receiving the private certificate from the scan engine 405, the scan assistant 410 may compare the private certificate with a public certificate to determine whether the public certificate and the private certificate are a matching public-private certificate pair. If the public certificate and the private certificate are a matching public-private certificate pair, the scan assistant 410 may authenticate the scan engine 405 to execute one or more scan operations on the asset. If the public certificate and the private certificate are not a matching public-private certificate pair, the scan assistant 410 may prohibit or prevent the scan engine 405 from executing one or more scan operations on the asset.

At operation 450, the scan assistant 410 may authenticate the scan engine 405 with the scan assistant 410 to execute the one or more scan operations on the asset. For example, upon receiving the private certificate from the scan engine 405, the scan assistant 410 may compare the private certificate with a public certificate and determine or verify that the public certificate and the private certificate are a matching public-private certificate pair. Based on determining or verifying that the public certificate and the private certificate are a matching public-private certificate pair, the scan assistant 410 may authenticate the scan engine 405 to execute one or more scan operations on the asset.

At operation 455, the scan assistant 410 may permit the scan engine 405 to execute the one or more scan operations on the asset. For example, upon receiving the private certificate from the scan engine 405, the scan assistant 410 may compare the private certificate with a public certificate and determine or verify that the public certificate and the private certificate are a matching public-private certificate pair. Based on determining or verifying that the public certificate and the private certificate are a matching public-private certificate pair, the scan assistant 410 may authenticate the scan engine 405 to execute one or more scan operations on the asset. After the scan assistant 410 authenticates the scan engine 405 to execute the one or more scan operations on the asset, the scan engine 405 may receive permission from the scan assistant 410 to execute the one or more scan operations on the asset. In some aspects, the scan engine 405 may receive an electronic message from the scan assistant 410 indicating that the scan engine 405 has permission to execute one or more scan operations on the asset. In some aspects, the scan assistant 410 may provide access for the scan engine 405 to execute the one or more scan operations on the asset.

At block 460, the scan assistant 410 may assist the scan engine 405 with (e.g., communicate with the scan engine 405 for . . . ) executing the one or more scan operations on the asset. For example, after the scan engine receives permission from the scan assistant 410 to execute the one or more scan operations on the asset, after or while the scan assistant 410 receives the plurality of scan requests from the scan engine 405 and transmits the plurality of scan response to the scan engine 405, the scan assistant may assist the scan engine 405 with the execution at least one of one or more commands or one or more scripts on the asset. As another example, the scan assistant 410 may communicate with the scan engine 405 for enabling the scan engine 405 to execute the one or more scan operations on the asset.

Figure 5:
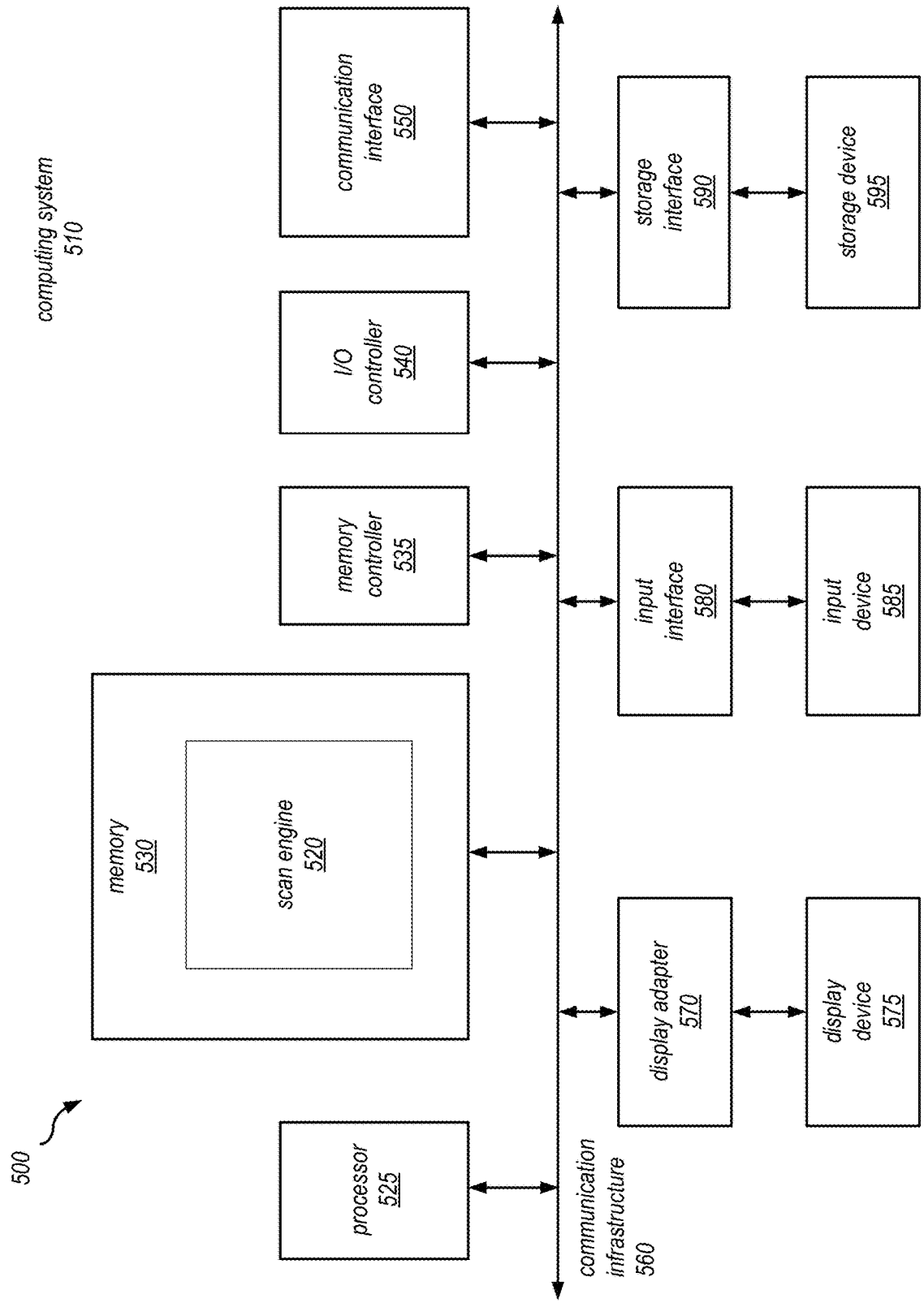
FIG. 5 is a block diagram of a computing device having a scan engine that may be used to implement asset assessment according to some aspects.

FIG. 5 is a block diagram 500 of a computing system 510 that may be used to implement asset assessment according to some aspects. The computing system 510 broadly represents a single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices, network appliances, storage controllers, and the like. In one configuration, computing system 510 may include at least one processor 525 and a memory 530. By executing the software that implements a scan engine 520, the computing system 510 becomes a special purpose computing device that is configured to perform asset assessment, as described herein.

Processor 525 generally represents any type or form of processing unit capable of processing data or interpreting and executing instructions. In certain embodiments, processor 525 may receive instructions from a software application or module that may cause processor 525 to perform the functions of one or more of the embodiments described and/or illustrated herein. For example, processor 525 may perform and/or be a means for performing all or some of the operations described herein. Processor 525 may also perform and/or be a means for performing any other operations, methods, or processes described and/or illustrated herein. Memory 530 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 510 may include both a volatile memory unit and a non-volatile storage device. In one example, program instructions implementing the scan engine 520 may be loaded into memory 530.

As shown in FIG. 5, the computing system 510 includes a scan engine 520, for example, stored on the memory 530. The scan engine 520 may include one or more electronically executable instructions that, when executed by the processor 525, may cause the processor 525 to receive, from a scan assistant, an event message indicating one or more events associated with an asset, transmit, to the scan assistant, a request for executing one or more scan operations, transmit, to the scan assistant, a private certificate, receive permission, for the scan assistant, to execute the one or more scan operations on the asset, and execute the one or more scan operations on the asset. The scan engine 502 may be the same as or at least similar to the scan engine 120 illustrated in FIG. 1, the scan engine 205 illustrated in FIG. 2, the scan engine 305 illustrated in FIG. 3, and the scan engine 405 illustrated in FIG. 4.

In certain embodiments, computing system 510 may also include one or more components or elements in addition to processor 525 and/or memory 530. For example, as shown, computing system 510 may include a memory controller 535, an Input/Output (I/O) controller 540, and a communication interface 550, each of which may be interconnected via a communication infrastructure. Communication infrastructure 560 generally represents any type or form of infrastructure capable of facilitating communication between one or more components of a computing device. Examples of communication infrastructure 560 include, without limitation, a communication bus (such as an Industry Standard Architecture (ISA), Peripheral Component Interconnect (PCI), PCI express (PCIe), or similar bus) and a network.

Memory controller 535 generally represents any type/form of device capable of handling memory or data or controlling communication between one or more components of computing system 510. In certain embodiments memory controller 535 may control communication between processor 525, memory 530, and I/O controller 540 via communication infrastructure 560, and may perform and/or be a means for performing, either alone or in combination with other elements, one or more of the operations or features described and/or illustrated herein. I/O controller 540 generally represents any type or form of module capable of coordinating and/or controlling the input and output functions of a computing device. For example, in certain embodiments I/O controller 540 may control or facilitate transfer of data between one or more elements of computing system 510, such as processor 525, memory 530, communication interface 550, display adapter 570, input interface 580, and storage interface 590.

Communication interface 550 broadly represents any type/form of communication device/adapter capable of facilitating communication between computing system 510 and other devices and may facilitate communication between computing system 510 and a private or public network. Examples of communication interface 550 include, a wired network interface (e.g., network interface card), a wireless network interface (e.g., a wireless network interface card), a modem, and any other suitable interface. Communication interface 550 may provide a direct connection to a remote server via a direct link to a network, such as the Internet, and may also indirectly provide such a connection through, for example, a local area network. Communication interface 550 may also represent a host adapter configured to facilitate communication between computing system 510 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 510 may also include at least one display device 575 coupled to communication infrastructure 560 via a display adapter 570 that generally represents any type or form of device capable of visually displaying information forwarded by display adapter 570. Display adapter 570 generally represents any type or form of device configured to forward graphics, text, and other data from communication infrastructure 560 (or from a frame buffer, as known in the art) for display on display device 575. Computing system 510 may also include at least one input device 585 coupled to communication infrastructure 560 via an input interface 580. Input device 585 generally represents any type or form of input device capable of providing input, either computer or human generated, to computing system 510. Examples of input device 585 include a keyboard, a pointing device, a speech recognition device, or any other input device.

Computing system 510 may also include storage device 595 coupled to communication infrastructure 560 via a storage interface 590. Storage device 595 generally represents any type or form of storage devices or mediums capable of storing data and/or other computer-readable instructions. For example, storage device 595 may include a magnetic disk drive (e.g., a so-called hard drive), a floppy disk drive, a magnetic tape drive, an optical disk drive, a flash drive, or the like. Storage interface 590 generally represents any type or form of interface or device for transmitting data between storage device 595, and other components of computing system 510. Storage device 595 may be configured to read from and/or write to a removable storage unit configured to store computer software, data, or other computer-readable information. Examples of suitable removable storage units include a floppy disk, a magnetic tape, an optical disk, a flash memory device, or the like. Storage device 595 may also include other similar structures or devices for allowing computer software, data, or other computer-readable instructions to be loaded into computing system 510. For example, storage device 595 may be configured to read and write software, data, or other computer-readable information. Storage device 595 may also be a part of computing system 510 or may be separate devices accessed through other interface systems.

Many other devices or subsystems may be connected to computing system 510. Conversely, all of the components and devices illustrated in the figure need not be present to practice the embodiments described and/or illustrated herein. The devices and subsystems referenced above may also be interconnected in different ways from that shown in the figure. Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in memory 530, and/or various portions of storage device 595. When executed by processor 525, a computer program loaded into computing system 510 may cause processor 525 to perform and/or be a means for performing the functions of one or more of the embodiments described/illustrated herein. Alternatively, one or more of the embodiments described and/or illustrated herein may be implemented in firmware and/or hardware.

Figure 6:
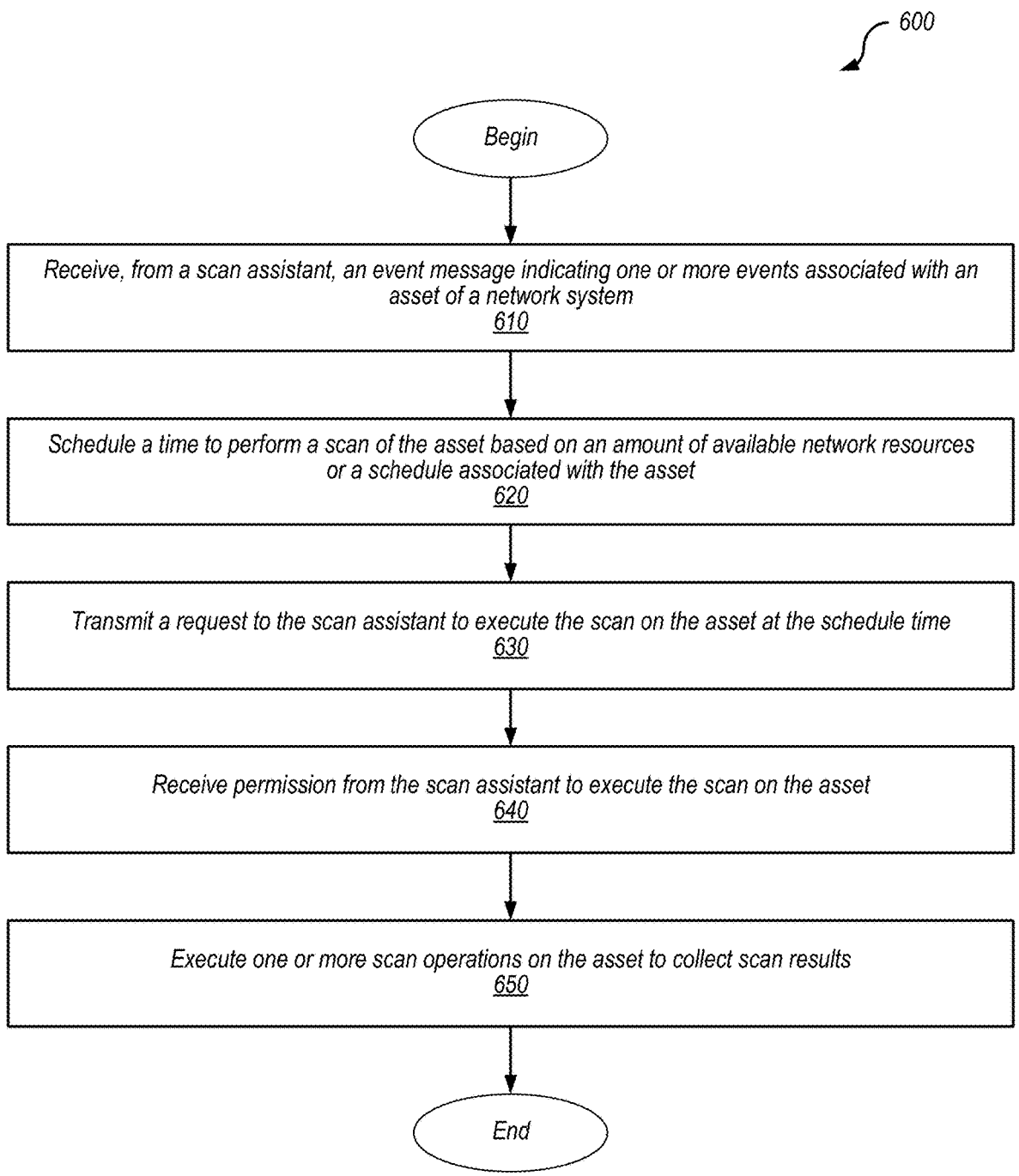
FIG. 6 shows a flowchart illustrating a process implemented by a scan engine on a computing device for performing asset assessment and/or event driven asset assessment according to some aspects.

FIG. 6 shows a flowchart illustrating a process 600 implemented by a scan engine on a computing system for performing asset assessment according to some aspects. The scan engine on the computing system may be the scan engine 520 on the computing system 510 illustrated in FIG. 5.

At block 605, the scan engine 520 may receive, from a scan assistant, an event message indicating an occurrence of the one or more events associated with an asset. In some aspects, the scan assistant may transmit, to the scan engine 520, an event message indicating that the one or more events are about to occur, that the one or more events are currently occurring, and/or that the one or more events having finished occurring. In some aspects, the scan assistant may detect that the one or more events are about to occur and/or are currently occurring and wait until the one or more events have occurred before transmitting the event message to the scan engine 520.

In some aspects, the event message may including an indication of an available time and/or a preferred time for the scan engine 520 to executing one or more scan operations on the asset. For example, the asset may have a processing schedule that is very busy or an availability schedule the prohibits scanning at one or more specified times. In this case, the event message may include an indication of one or more times that the asset is available for scanning based on the processing schedule or availability schedule. In some aspects, the event message may include an indication of one or more schedules of one or more other assets that may be scheduled to interact with the asset associated with the scan assistant. Based on the event message, the scan engine 520 may determine when the scan engine 520 can send a private certificate to the scan assistant and when the asset is available for the scan engine 520 to perform one or more scan operations for asset assessment as described herein.

At block 610, the scan engine 520 may transmit, to the scan assistant, a private certificate. The scan engine 520 may transmit, to the scan assistant, a private certificate for determining a state of the asset. The asset may include at least one computing resource. In some aspects, the private certificate may be generated by the scan engine 520 for authentication with the scan assistant for the scan engine 520 to execute the one or more scan operations of the asset. Alternatively, the private certificate may be stored with the scan engine 520 during installation of the scan engine 520 on the electronic device for subsequent use by the scan engine 520, for example, with the scan assistant. The scan engine 520 may transmit the private certificate to the scan assistant so that the scan assistant may perform one-way authentication of the scan engine 520 to perform one or more scan operations on the asset. In some aspects, as described herein, the scan assistant may generate the public certificate for authenticating the scan engine 520 to execute one or more scan operations on the asset after (e.g., in response to) receiving a private certificate from the scan engine 520.

At block 615, the scan engine 520 may receive permission from the scan assistant to execute the one or more scan operations on the asset. For example, upon receiving the private certificate from the scan engine 520, the scan assistant may compare the private certificate with a public certificate and determine or verify that the public certificate and the private certificate are a matching public-private certificate pair. Based on determining or verifying that the public certificate and the private certificate are a matching public-private certificate pair, the scan assistant may authenticate the scan engine 520 to execute one or more scan operations on the asset. After the scan assistant authenticates the scan engine 520 to execute the one or more scan operations on the asset, the scan engine 520 may receive permission from the scan assistant to execute the one or more scan operations on the asset. In some aspects, the scan engine 520 may receive an electronic message from the scan assistant indicating that the scan engine 520 has permission to execute one or more scan operations on the asset. In some aspects, the scan assistant may provide access for the scan engine 520 to execute the one or more scan operations on the asset.

At block 620, the scan engine 520 may execute the one or more scan operations on the asset. For example, after the scan engine 520 receives permission from the scan assistant to execute the one or more scan operations on the asset, after or while the scan assistant receives the plurality of scan requests from the scan engine 520 and transmits the plurality of scan response to the scan engine 520, the scan assistant may assist the scan engine 520 with the execution at least one of one or more commands or one or more scripts on the asset. As another example, the scan assistant may communicate with the scan engine 520 for enabling the scan engine 520 to execute the one or more scan operations on the asset.

Figure 7:
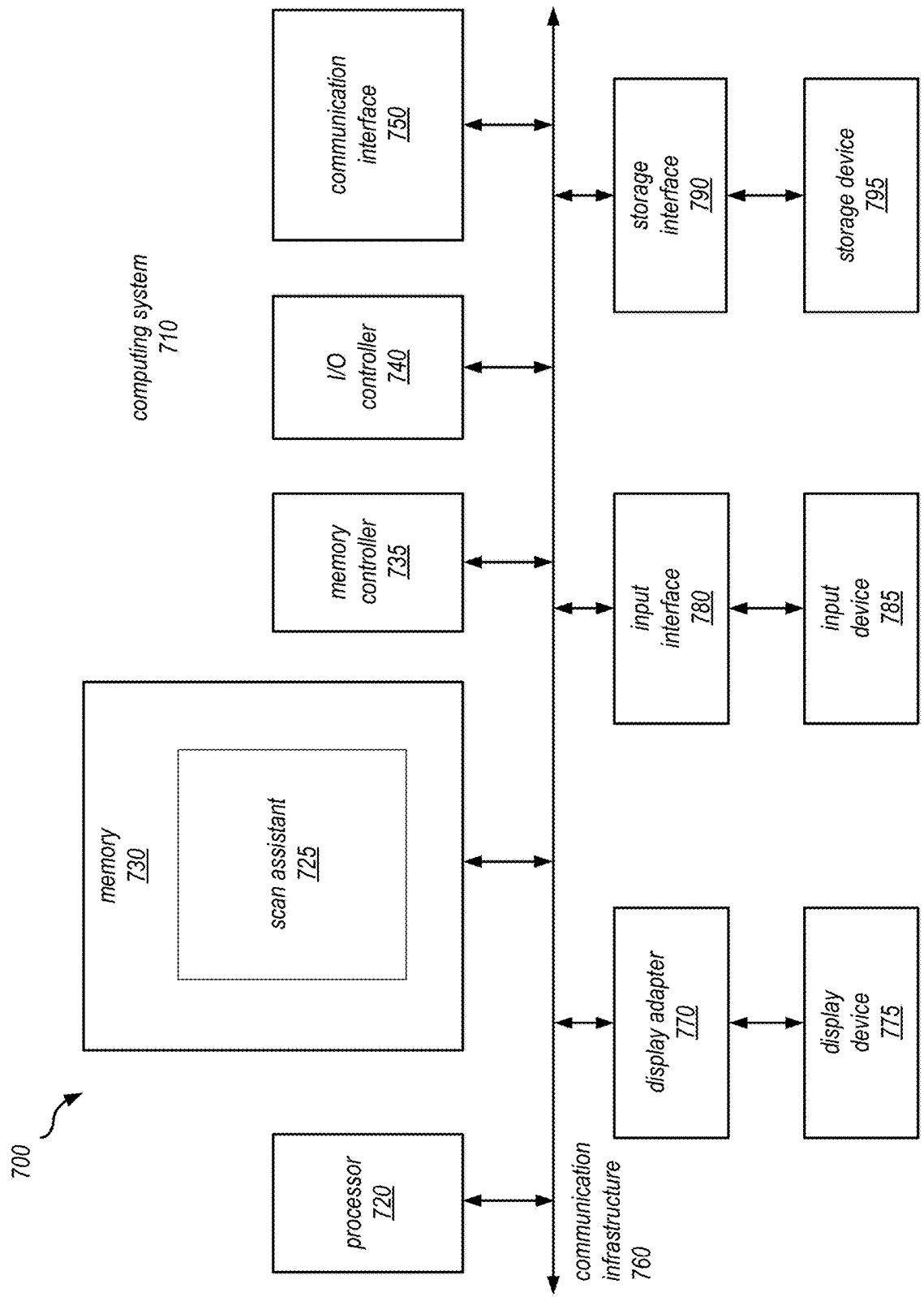
FIG. 7 is a block diagram of a computing device having a scan assistant that may be used to implement asset assessment according to some aspects.

FIG. 7 is a block diagram 700 of a computing system 710 that may be used to implement asset assessment according to some aspects. The computing system 710 broadly represents a single or multi-processor computing device or system capable of executing computer-readable instructions. Examples of computing system 710 include, without limitation, any one or more of a variety of devices including workstations, personal computers, laptops, client-side terminals, servers, distributed computing systems, handheld devices, network appliances, storage controllers, and the like. In one configuration, computing system 710 may include at least one processor 725 and a memory 730. By executing the software that implements a scan assistant 720, the computing system 710 becomes a special purpose computing device that is configured to perform asset assessment, as described herein.

Processor 725 generally represents any type or form of processing unit capable of processing data or interpreting and executing instructions. In certain embodiments, processor 725 may receive instructions from a software application or module that may cause processor 725 to perform the functions of one or more of the embodiments described and/or illustrated herein. For example, processor 725 may perform and/or be a means for performing all or some of the operations described herein. Processor 725 may also perform and/or be a means for performing any other operations, methods, or processes described and/or illustrated herein. Memory 730 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 710 may include both a volatile memory unit and a non-volatile storage device. In one example, program instructions implementing the scan assistant 720 may be loaded into memory 730.

As shown in FIG. 7, the computing system 710 includes a scan assistant 720, for example, stored on the memory 730. The scan assistant 720 may include one or more electronically executable instructions that, when executed by the processor 725, may cause the processor 725 to receive an indication that the scan assistant 720 is installed on an asset of a network system, generate a public certificate for authenticating a scan engine to execute one or more scan operations on the asset, receive, from a scan engine, a private certificate, verify that the private certificate and the public certificate are a matching public-private certificate pair, authenticate a scan engine with the scan assistant 720 to execute one or more scan operations on the asset, permit a scan engine to execute one or more scan operations on an asset, detect one or more events associated with the asset, and transmit, to a scan engine, an event message indicating the one or more events associated with the asset. The scan assistant 720 may be the same as or at least similar to the scan assistant 125 illustrated in FIG. 1, the scan assistant 210 illustrated in FIG. 2, the scan assistant 310 illustrated in FIG. 3, and the scan assistant 410 illustrated in FIG. 4. For example, the scan assistant 810 may be for installation on an asset such as a client asset 315 of FIG. 3 as described herein.

In certain embodiments, computing system 710 may also include one or more components or elements in addition to processor 725 and/or memory 730. For example, as shown, computing system 710 may include a memory controller 735, an Input/Output (I/O) controller 740, and a communication interface 750, each of which may be interconnected via a communication infrastructure. Communication infrastructure 760 generally represents any type or form of infrastructure capable of facilitating communication between one or more components of a computing device. Examples of communication infrastructure 760 include, without limitation, a communication bus (such as an Industry Standard Architecture (ISA), Peripheral Component Interconnect (PCI), PCI express (PCIe), or similar bus) and a network.

Memory controller 735 generally represents any type/form of device capable of handling memory or data or controlling communication between one or more components of computing system 710. In certain embodiments memory controller 735 may control communication between processor 725, memory 730, and I/O controller 740 via communication infrastructure 760, and may perform and/or be a means for performing, either alone or in combination with other elements, one or more of the operations or features described and/or illustrated herein. I/O controller 740 generally represents any type or form of module capable of coordinating and/or controlling the input and output functions of a computing device. For example, in certain embodiments I/O controller 740 may control or facilitate transfer of data between one or more elements of computing system 710, such as processor 725, memory 730, communication interface 750, display adapter 770, input interface 780, and storage interface 790.

Communication interface 750 broadly represents any type/form of communication device/adapter capable of facilitating communication between computing system 710 and other devices and may facilitate communication between computing system 710 and a private or public network. Examples of communication interface 750 include, a wired network interface (e.g., network interface card), a wireless network interface (e.g., a wireless network interface card), a modem, and any other suitable interface. Communication interface 750 may provide a direct connection to a remote server via a direct link to a network, such as the Internet, and may also indirectly provide such a connection through, for example, a local area network. Communication interface 750 may also represent a host adapter configured to facilitate communication between computing system 710 and additional network/storage devices via an external bus.

Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 710 may also include at least one display device 775 coupled to communication infrastructure 760 via a display adapter 770 that generally represents any type or form of device capable of visually displaying information forwarded by display adapter 770. Display adapter 770 generally represents any type or form of device configured to forward graphics, text, and other data from communication infrastructure 760 (or from a frame buffer, as known in the art) for display on display device 775. Computing system 710 may also include at least one input device 785 coupled to communication infrastructure 760 via an input interface 780. Input device 785 generally represents any type or form of input device capable of providing input, either computer or human generated, to computing system 710. Examples of input device 785 include a keyboard, a pointing device, a speech recognition device, or any other input device.

Computing system 710 may also include storage device 795 coupled to communication infrastructure 760 via a storage interface 790. Storage device 795 generally represents any type or form of storage devices or mediums capable of storing data and/or other computer-readable instructions. For example, storage device 795 may include a magnetic disk drive (e.g., a so-called hard drive), a floppy disk drive, a magnetic tape drive, an optical disk drive, a flash drive, or the like. Storage interface 790 generally represents any type or form of interface or device for transmitting data between storage device 795, and other components of computing system 710. Storage device 795 may be configured to read from and/or write to a removable storage unit configured to store computer software, data, or other computer-readable information. Examples of suitable removable storage units include a floppy disk, a magnetic tape, an optical disk, a flash memory device, or the like. Storage device 795 may also include other similar structures or devices for allowing computer software, data, or other computer-readable instructions to be loaded into computing system 710. For example, storage device 795 may be configured to read and write software, data, or other computer-readable information. Storage device 795 may also be a part of computing system 710 or may be separate devices accessed through other interface systems.

Many other devices or subsystems may be connected to computing system 710. Conversely, all of the components and devices illustrated in the figure need not be present to practice the embodiments described and/or illustrated herein. The devices and subsystems referenced above may also be interconnected in different ways from that shown in the figure. Computing system 710 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 710 for storage in memory via a network such as the Internet or upon a carrier medium.

The computer-readable medium containing the computer program may be loaded into computing system 710. All or a portion of the computer program stored on the computer-readable medium may then be stored in memory 730, and/or various portions of storage device 795. When executed by processor 725, a computer program loaded into computing system 710 may cause processor 725 to perform and/or be a means for performing the functions of one or more of the embodiments described/illustrated herein. Alternatively, one or more of the embodiments described and/or illustrated herein may be implemented in firmware and/or hardware.

Figure 8:
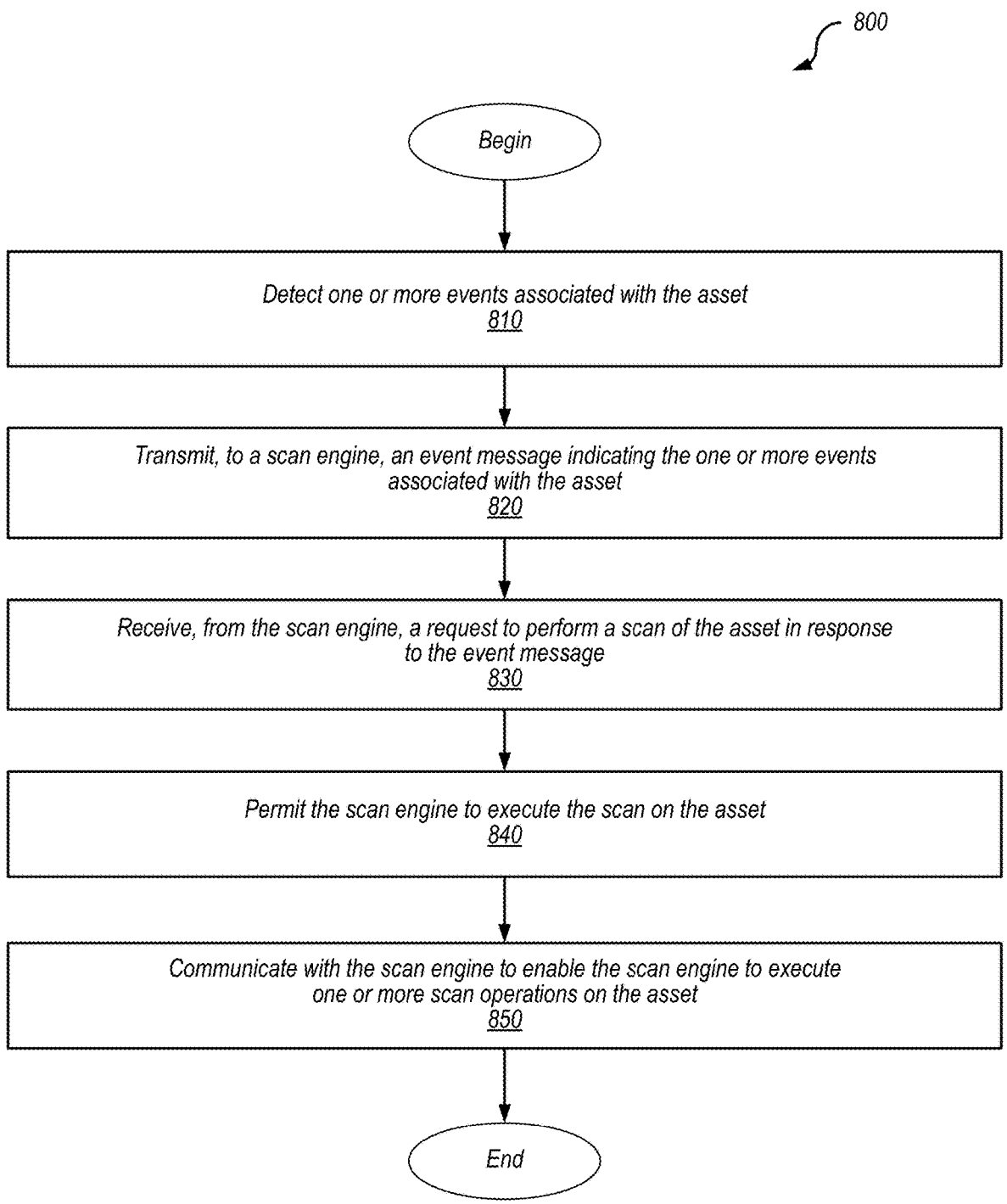
FIG. 8 shows a flowchart illustrating a process implemented by a scan assistant on a computing device for performing asset assessment and/or event driven asset assessment according to some aspects.

FIG. 8 shows a flowchart illustrating a process 800 implemented by a scan assistant on computing system for performing asset assessment according to some aspects. The scan assistant on the computing system may be the scan assistant 720 on the computing system 710 illustrated in FIG. 14. In some aspects, the computing system 710 may be an asset associated with the scan assistant 720.

At block 805, the scan assistant 720 may receive an indication that the scan assistant 720 is installed on an asset of a network system. For example, the scan assistant 720 may receive an indication that the scan assistant 720 is installed on an asset of a network system in response to installing the scan assistant 720 on the asset of the network system. As another example, the scan assistant 720 may receive an indication that the scan assistant 720 is installed on an asset of a network system when the asset of the network system is powered on or activated for operation.

At block 810, the scan assistant 720 may detect one or more events associated with the asset. For example, the scan assistant 720 may detect that an event is occurring or is about to occur involving an associated asset. In some aspects, the event may be a software installation on the asset. Additionally, or alternatively, the event may be a patch installation on the asset. Additionally, or alternatively, the event may be a configuration change of the asset. In some aspects, the scan assistant 720 may detect that the one or more events are about to occur, that the one or more events are in the process of occurring, and/or that the one or more events have finished occurring.

At block 815, the scan assistant 720 may transmit, to the scan engine, an event message indicating an occurrence of the one or more events associated with the asset. In some aspects, the scan assistant may transmit, to the scan engine, an event message indicating that the one or more events are about to occur, that the one or more events are currently occurring, and/or that the one or more events having finished occurring. In some aspects, the scan assistant may detect that the one or more events are about to occur and/or are currently occurring and wait until the one or more events have occurred before transmitting the event message to the scan engine.

In some aspects, the event message may including an indication of an available time and/or a preferred time for the scan engine to executing one or more scan operations on the asset. For example, the asset may have a processing schedule that is very busy or an availability schedule the prohibits scanning at one or more specified times. In this case, the event message may include an indication of one or more times that the asset is available for scanning based on the processing schedule or availability schedule. In some aspects, the event message may include an indication of one or more schedules of one or more other assets that may be scheduled to interact with the asset associated with the scan assistant 720. Based on the event message, the scan engine may determine when the scan engine can send a private certificate to the scan assistant 720 and when the asset is available for the scan engine to perform one or more scan operations for asset assessment as described herein.

At block 820, the scan assistant 720 may generate a public certificate for authenticating the scan engine to execute one or more scan operations on the asset. For example, the scan assistant 720 may generate a public certificate for authenticating the scan engine to execute one or more scan operations on the asset after (e.g., in response to) receiving the indication that the scan assistant 720 is installed on the asset of the network system. As another example, the scan assistant 720 may generate a public certificate for authenticating the scan engine to execute one or more scan operations on the asset after (e.g., in response to) receiving a private certificate from the scan engine as described further herein.

At block 825, the scan assistant 720 may receive a private certificate from the scan engine. The scan assistant 720 may receive a private certificate from the scan engine for determining a state of the asset. The asset may include at least one computing resource. In some aspects, the private certificate may be generated by the scan engine for authentication with the scan assistant 720 for the scan engine to execute the one or more scan operations of the asset. Alternatively, the private certificate may be stored with the scan engine during installation of the scan engine on the electronic device for subsequent use by the scan engine, for example, with the scan assistant 720. The scan engine may transmit the private certificate to the scan assistant 720 so that the scan assistant 720 may perform one-way authentication of the scan engine to perform one or more scan operations on the asset. In some aspects, as described herein, the scan assistant 720 may generate the public certificate for authenticating the scan engine to execute one or more scan operations on the asset after (e.g., in response to) receiving a private certificate from the scan engine.

At block 830, the scan assistant 720 may verify that private certificate and the public certificate are a matching public-private certificate pair. For example, upon receiving the private certificate from the scan engine, the scan assistant 720 may compare the private certificate with a public certificate to determine whether the public certificate and the private certificate are a matching public-private certificate pair. If the public certificate and the private certificate are a matching public-private certificate pair, the scan assistant 720 may authenticate the scan engine to execute one or more scan operations on the asset. If the public certificate and the private certificate are not a matching public-private certificate pair, the scan assistant 720 may prohibit or prevent the scan engine from executing one or more scan operations on the asset.

At block 835, the scan assistant 720 may authenticate the scan engine with the scan assistant 720 to execute the one or more scan operations on the asset. For example, upon receiving the private certificate from the scan engine, the scan assistant 720 may compare the private certificate with a public certificate and determine or verify that the public certificate and the private certificate are a matching public-private certificate pair. Based on determining or verifying that the public certificate and the private certificate are a matching public-private certificate pair, the scan assistant 720 may authenticate the scan engine to execute one or more scan operations on the asset.

At block 840, the scan assistant 720 may permit the scan engine to execute the one or more scan operations on the asset. For example, upon receiving the private certificate from the scan engine, the scan assistant 720 may compare the private certificate with a public certificate and determine or verify that the public certificate and the private certificate are a matching public-private certificate pair. Based on determining or verifying that the public certificate and the private certificate are a matching public-private certificate pair, the scan assistant 720 may authenticate the scan engine to execute one or more scan operations on the asset. After the scan assistant 720 authenticates the scan engine to execute the one or more scan operations on the asset, the scan engine may receive permission from the scan assistant 720 to execute the one or more scan operations on the asset. In some aspects, the scan engine may receive an electronic message from the scan assistant 720 indicating that the scan engine has permission to execute one or more scan operations on the asset. In some aspects, the scan assistant 720 may provide access for the scan engine to execute the one or more scan operations on the asset.

At block 845, the scan assistant 720 may assist the scan engine with (e.g., communicate with the scan engine for . . . ) executing the one or more scan operations on the asset. For example, after the scan engine receives permission from the scan assistant 720 to execute the one or more scan operations on the asset, after or while the scan assistant 720 receives the plurality of scan requests from the scan engine and transmits the plurality of scan response to the scan engine, the scan assistant may assist the scan engine with the execution at least one of one or more commands or one or more scripts on the asset. As another example, the scan assistant 720 may communicate with the scan engine for enabling the scan engine to execute the one or more scan operations on the asset.

Figure 9:
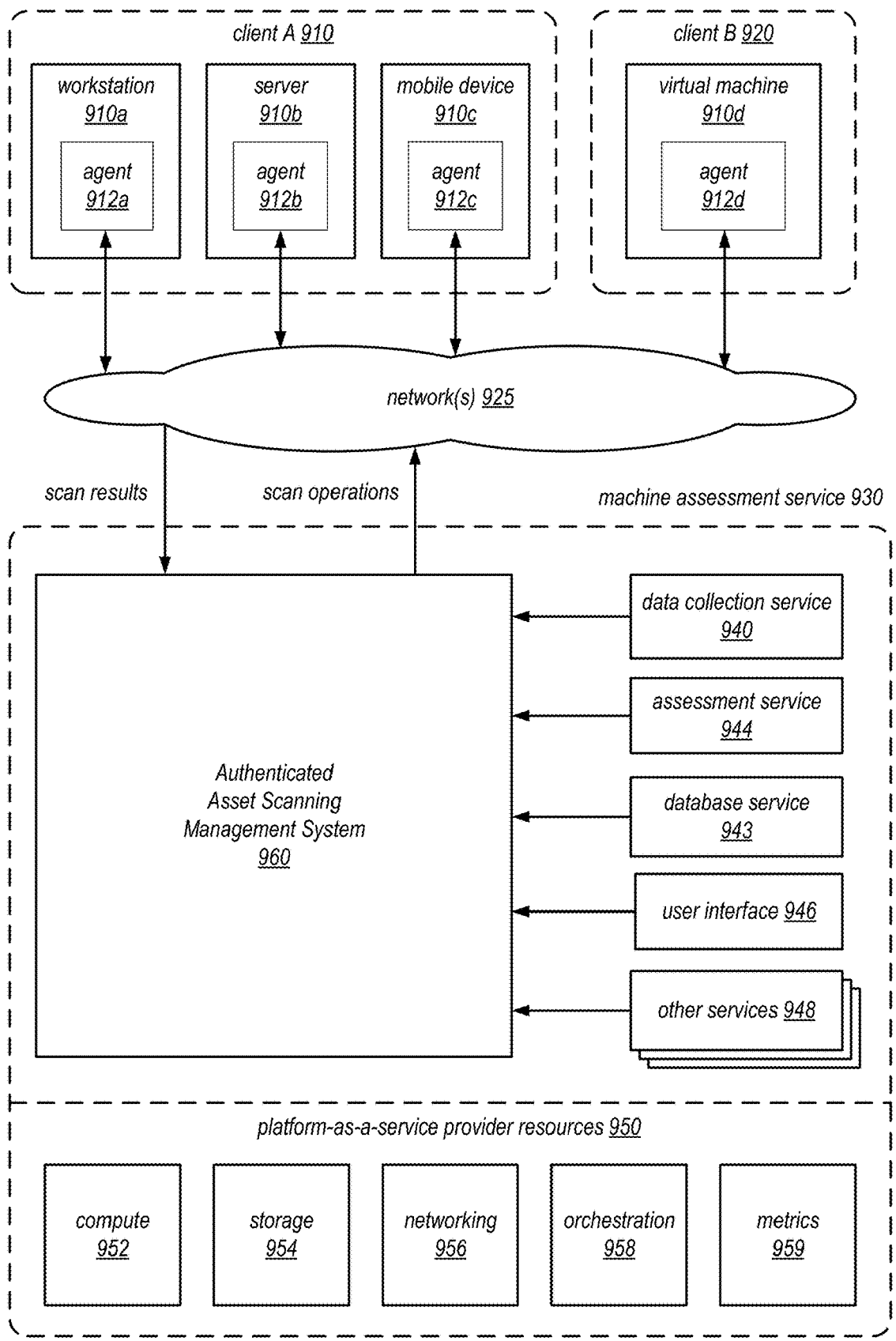
FIG. 9 is a block diagram illustrating an authenticated asset scanning management system that is implemented as part of a machine assessment service, which is in turn implemented in a platform-as-a-service provider network that contains platform-as-a-service resources, according to some aspects.

FIG. 9 is a block diagram illustrating an authenticated asset scanning management system 960 (e.g., scan engine 120 of FIG. 1, scan engine 205 of FIG. 2, scan engine 305 of FIG. 3, scan engine 405 of FIG. 4, scan engine 520 of FIG. 5) that is implemented as part of a machine assessment service 930, which is in turn implemented in a platform-as-a-service provider network that contains platform-as-a-service resources 950, according to some embodiments.

As shown, the machine assessment service 930 may be configured to interact with various agents executing on different clients 910 and 920 (e.g., a first client network 130a of FIG. 1, a second client network 130b of FIG. 1). The different clients may be different groups, organizations, companies, or other types of entities. In some embodiments, distinct clients 910 and 920 may be associated with a different user account of the machine assessment service 930. As shown, the clients in this example may own different types of computing resources (e.g., first client asset #1 145a, first client asset #2 150a, first client asset #3 155a, second client asset #1 145b, second client asset #2 150b, second client asset #3 155b), such as a workstation 910a, a server 910b, a mobile device 910c, and a virtual machine 910d. The virtual machine 910d may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. As another example, another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, client machines 910 may include other types of computing systems, including embedded systems, networking devices, storage devices, Internet-of-Things (IoT) devices, vehicles, and the like.

As shown, each of these types of machines or execution environments may be monitored by agents 912a-d (e.g., scan assistant 125 of FIG. 1, scan assistant 210 of FIG. 2, scan assistant 310 of FIG. 3, scan assistant 410 of FIG. 4, scan assistant 515 of FIG. 5, scan assistant 710 of FIG. 7, scan assistant 910 of FIG. 9, scan assistant 1010 of FIG. 10, scan assistant 1425 of FIG. 14) that collect machine characteristic data from the machines or execution environments. In some embodiments, the agents 912 may be implemented as a lightweight software module on the client machines 910. Different types of agents 912 may be implemented for different machine platforms, such as WINDOWS, LINUX, or MAC machines. In some embodiments, the agent 912 may be designed to run on a different computing system from the machine 910 being monitored. In that case, the agent 912 may be configured to establish network connections to the machine 910 and collect machine characteristics data over these network connections.

As shown, the agents 912 are configured to communicate with the machine assessment service 930 over one or more networks 925. In various embodiments, the network(s) 925 may encompass any suitable combination of networking hardware and protocols necessary to establish communications between the agent 912 and the machine assessment service 930. In some embodiments, the machine 910 may execute in a private network of a company, behind a company firewall, and the network 925 may include a public network such as the Internet, which lies outside the firewall. The network 925 may encompass the different telecommunications networks and service providers that collectively implement the Internet. In some embodiments, the network 925 may also include private networks such as private local area networks (LANs), private wide area networks (WANs), or private wireless networks. The network 925 may be implemented using different hardware (e.g., modems, routers, switches, load balancers, proxy servers, etc.) and software (e.g., protocol stacks, accounting software, firewall/security software, etc.) for establishing networking links between the client machines 910 and the machine assessment service 930.

As shown, the depicted system is implemented using client machines 910a-d, and a machine assessment service 930. In some embodiments, the depicted operations on the client machines 910a-d may be performed by the agent 912a-d executing on the client machine, which is configured to communicate with the machine assessment service 930 over one or more networks 925, to collect and report machine characteristics data about the client machines to the machine assessment service. In some embodiments, the machine assessment system 930 may be implemented as a cloud-based or network-accessible service, which is configured to receive machine characteristics data from a large number of different client machines and perform security vulnerability assessments on remote machines based on the received data. In some embodiments, each collection agent on the client machines may be assigned a unique agent ID that identifies the agent to the machine assessment service.

As shown, the machine assessment service may include a number of services implemented on of the resources 950 provided by the PaaS provider. As shown, the overall machine assessment system 930 also includes an assessment service 944, a database service 943, and other services 948. A data store or connection map may be hosted in the database service 943. In some embodiments, the machine assessment service 930 may provide the database service 943 to store different snapshots being maintained by a collection process. The database service 943 may be implemented on top of storage resources 954 provided by the PaaS provider. For example, the PaaS provider my provide storage in the form of a database, a file system, or a volume hosted in the cloud. In some embodiments, the storage provided by the machine assessment service 930 may be persistent storage. In some embodiments, the provided storage may not be guaranteed to be persistent, so that if the service is restarted, some of data may be lost. In some embodiments, the database service 943 may be enhanced using a high-performance in-memory cache, which may be provided by the PaaS provider as a managed cluster of compute nodes, such as a REDIS cluster.

A machine assessment component may be implemented by an assessment service 944. The assessment process may be conducted by an assessment orchestrator, which may invoke various types of assessments of the client machine. In some embodiments, the assessments may determine various security vulnerabilities of the client machine based on the collected machine characteristics. For example, an assessment may detect conditions such as the existence of malware signatures, missing application patches, incorrect or suspicious file permissions or locations, users with inappropriate access privileges, among other things. In some embodiments, the assessment service may observe and track these conditions over time, to determine a problematic or suspicious pattern of changes on the remote machine. The assessment service 944 may then generate an assessment report that details any detected security vulnerabilities about the machine, which may be provided the machine's owners via a user interface 946.

As shown, the machine assessment service 930 may also implement a user interface 946, which may be a web-based graphical or command line user interface. The user interface 946 can provide a data collection configuration interface, a client machine inspection interface, an assessment reporting interface, and/or an authenticated asset scanning management system interface. The client machine inspection interface may be used to examine the current state of the client machine. For example, the client machine inspection interface may allow users to navigate through the client machine's configurations and files, or issue queries against the configuration settings of the client machine. The assessment reporting interface may be used to provide results of machine assessments to users. In some embodiments, the assessment reporting interface may include a notification interface that pushes notifications to registered users, for example, via email or text, or to a client-side repository. The authenticated asset scanning management system interface can allow users to directly interact with computing resources 910a-d by sending commands to one or more of the resources to be executed.

As shown, the machine assessment service 930 may be implemented within a platform-as-a-service provider network, and the clients of the machine assessment service 930 may convey services requests to and receive responses from PaaS provider network via network 925. In some embodiments, the service request and responses may be web services requests and responses and formatted as JSON documents. The machine assessment service 930 may support REST-style or document-based (e.g., SOAP-based) types of web services requests. In some embodiments, the machine assessment service 930 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 950, which can be leased by service customers to implement custom hosted services. As shown, the PaaS provider may provide resource services such as compute resource service 952, storage resource service 954, networking resources service 956, orchestration service 958, and resource metrics service 959. The services of the machine assessment service 930 may be built using these underlying resource services provided by the PaaS provider. In some embodiments, the PaaS resources 950 may implement features such as load balancing of incoming service requests and/or dynamic management and scaling of service node pools. In some embodiments, each of the services 940, 943, 944, 946, 948, and the authenticated asset scanning management system 960 may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 10:
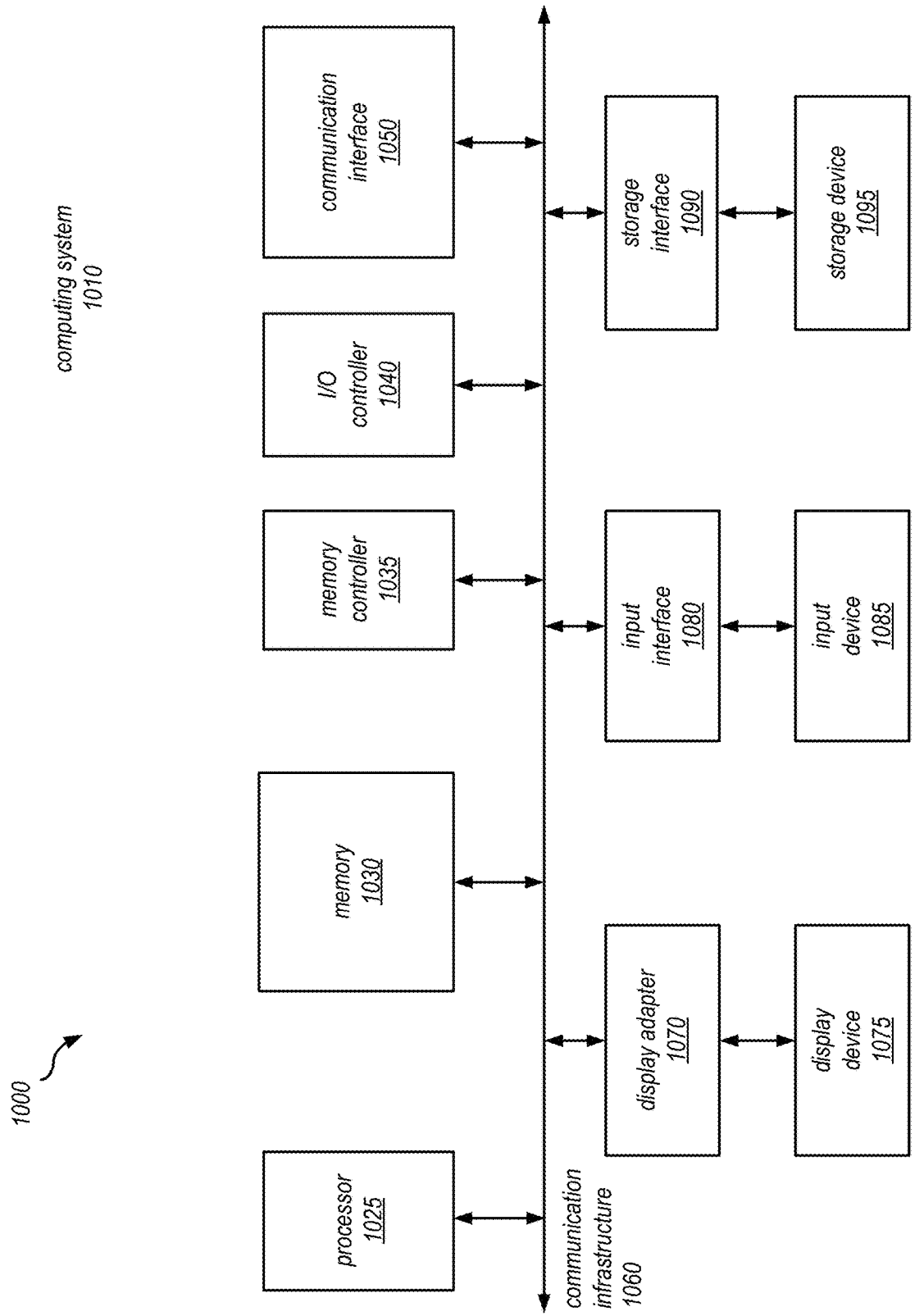
FIG. 10 is a block diagram of a computing system that may be used to implement one or more portions of a system for performing asset assessment according to some aspects.

FIG. 10 is a block diagram of a computing system that may be used to implement one or more portions of a system for performing asset assessment according to some aspects. For example, computing system 1010 can be used to implement asset assessment as described herein. Computing system 1010 broadly represents a single or multi-processor computing device or system capable of executing computer-readable instructions. Examples of computing system 1010 include, without limitation, any one or more of a variety of devices including workstations, personal computers, laptops, client-side terminals, servers, distributed computing systems, handheld devices, network appliances, storage controllers, and the like. In one configuration, computing system 1010 may include at least one processor 1025 and a memory 1030. By executing the software that implements asset assessment, computing system 1010 becomes a special purpose computing device that is configured to perform asset assessment, as described herein.

Processor 1025 generally represents any type or form of processing unit capable of processing data or interpreting and executing instructions. In certain embodiments, processor 1025 may receive instructions from a software application or module that may cause processor 1025 to perform the functions of one or more of the embodiments described and/or illustrated herein. For example, processor 1025 may perform and/or be a means for performing all or some of the operations described herein. Processor 1025 may also perform and/or be a means for performing any other operations, methods, or processes described and/or illustrated herein. Memory 1030 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments, computing system 1010 may include both a volatile memory unit and a non-volatile storage device. In one example, program instructions implementing asset assessment may be loaded into memory 1030.

In certain embodiments, computing system 1010 may also include one or more components or elements in addition to processor 1025 and/or memory 1030. For example, as shown, computing system 1010 may include a memory controller 1035, an Input/Output (I/O) controller 1040, and a communication interface 1050, each of which may be interconnected via a communication infrastructure. Communication infrastructure 1060 generally represents any type or form of infrastructure capable of facilitating communication between one or more components of a computing device. Examples of communication infrastructure 1060 include, without limitation, a communication bus (such as an Industry Standard Architecture (ISA), Peripheral Component Interconnect (PCI), PCI express (PCIe), or similar bus) and a network.

Memory controller 1035 generally represents any type/form of device capable of handling memory or data or controlling communication between one or more components of computing system 1010. In certain embodiments memory controller 1035 may control communication between processor 1025, memory 1030, and I/O controller 1040 via communication infrastructure 1060, and may perform and/or be a means for performing, either alone or in combination with other elements, one or more of the operations or features described and/or illustrated herein. I/O controller 1040 generally represents any type or form of module capable of coordinating and/or controlling the input and output functions of a computing device. For example, in certain embodiments I/O controller 1040 may control or facilitate transfer of data between one or more elements of computing system 1010, such as processor 1025, memory 1030, communication interface 1050, display adapter 1070, input interface 1080, and storage interface 1090.

Communication interface 1050 broadly represents any type/form of communication device/adapter capable of facilitating communication between computing system 1010 and other devices and may facilitate communication between computing system 1010 and a private or public network. Examples of communication interface 1050 include, a wired network interface (e.g., network interface card), a wireless network interface (e.g., a wireless network interface card), a modem, and any other suitable interface. Communication interface 1050 may provide a direct connection to a remote server via a direct link to a network, such as the Internet, and may also indirectly provide such a connection through, for example, a local area network. Communication interface 1050 may also represent a host adapter configured to facilitate communication between computing system 1010 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 1010 may also include at least one display device 1075 coupled to communication infrastructure 1060 via a display adapter 1070 that generally represents any type or form of device capable of visually displaying information forwarded by display adapter 1070. Display adapter 1070 generally represents any type or form of device configured to forward graphics, text, and other data from communication infrastructure 1060 (or from a frame buffer, as known in the art) for display on display device 1075. Computing system 1010 may also include at least one input device 1085 coupled to communication infrastructure 1060 via an input interface 1080. Input device 1085 generally represents any type or form of input device capable of providing input, either computer or human generated, to computing system 1010. Examples of input device 1085 include a keyboard, a pointing device, a speech recognition device, or any other input device.

Computing system 1010 may also include storage device 1095 coupled to communication infrastructure 1060 via a storage interface 1090. Storage device 1095 generally represents any type or form of storage devices or mediums capable of storing data and/or other computer-readable instructions. For example, storage device 1095 may include a magnetic disk drive (e.g., a so-called hard drive), a floppy disk drive, a magnetic tape drive, an optical disk drive, a flash drive, or the like. Storage interface 1090 generally represents any type or form of interface or device for transmitting data between storage device 1095, and other components of computing system 1010. Storage device 1095 may be configured to read from and/or write to a removable storage unit configured to store computer software, data, or other computer-readable information. Examples of suitable removable storage units include a floppy disk, a magnetic tape, an optical disk, a flash memory device, or the like. Storage device 1095 may also include other similar structures or devices for allowing computer software, data, or other computer-readable instructions to be loaded into computing system 1010. For example, storage device 1095 may be configured to read and write software, data, or other computer-readable information. Storage device 1095 may also be a part of computing system 1010 or may be separate devices accessed through other interface systems.

Many other devices or subsystems may be connected to computing system 1010. Conversely, all of the components and devices illustrated in the figure need not be present to practice the embodiments described and/or illustrated herein. The devices and subsystems referenced above may also be interconnected in different ways from that shown in the figure. Computing system 1010 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1010 for storage in memory via a network such as the Internet or upon a carrier medium.

The computer-readable medium containing the computer program may be loaded into computing system 1010. All or a portion of the computer program stored on the computer-readable medium may then be stored in memory 1030, and/or various portions of storage device 1095. When executed by processor 1025, a computer program loaded into computing system 1010 may cause processor 1025 to perform and/or be a means for performing the functions of one or more of the embodiments described/illustrated herein. Alternatively, one or more of the embodiments described and/or illustrated herein may be implemented in firmware and/or hardware.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure.

What is claimed is:

1. A method for asset assessment, comprising:
   receiving, by a scan engine, an event message from a scan assistant executing on an asset of a network system for determining a state of the asset, wherein the asset comprises at least one computing resource, wherein the event message comprises an indication of one or more events associated with the asset detected by the scan assistant;
   responsive to receiving the event message, transmitting, by the scan engine, a request to the scan assistant for executing one or more scan operations on the asset upon determining at least one of an amount of available network resources or a schedule associated with the asset indicated in the event message;
   receiving, by the scan engine, permission from the scan assistant for executing the one or more scan operations on the asset; and
   responsive to receiving the permission, executing, by the scan engine and in cooperation with the scan assistant, the one or more scan operations on the asset.

2. The method of claim 1, wherein transmitting the request to the scan assistant for executing the one or more scan operations on the asset based on at least one of the amount of available network resources or the schedule associated with the asset comprises at least one:
   transmitting the request to the scan assistant in response to receiving the event message based on a current amount of available network resources being above an available network resources threshold; or
   transmitting the request to the scan assistant in response to receiving the event message based on the schedule associated with the asset having a current time slot available for executing the one or more scan operations.

3. The method of claim 1, wherein transmitting the request to the scan assistant for executing the one or more scan operations on the asset based on at least one of the amount of available network resources or the schedule associated with the asset comprises at least one:
   transmitting the request to the scan assistant at a later time after receiving the event message based on an amount of available network resources being below an available network resources threshold a time when the event message is received; or
   transmitting the request to the scan assistant at the later time after receiving the event message based on the schedule associated with the asset having an available time slot for executing the one or more scan operations at the later time.

4. The method of claim 3, further comprising:
   determining, by the scan engine, the later time; and
   providing, by the scan engine, an indication of the later time for display on a display screen of a device.

5. A method for asset assessment, comprising:
   in response to executing a scan assistant on an asset, the scan assistant performing:
      detecting one or more events associated with the asset;
      transmitting an event message to a scan engine upon detecting the one or more events, wherein the event message indicates a schedule of one or more operations detected by the scan assistant, associated with the asset;
      receiving a request from the scan engine to execute one or more scan operations on the asset upon receiving the event message;
      permitting the scan engine to execute the one or more scan operations on the asset; and in response to said permitting, executing the one or more scan operations on the asset in cooperation with the scan engine.

6. The method of claim 5, further comprising:
determining, by the scan assistant, the schedule of one or more network operations associated with the asset.

7. The method of claim 6, wherein permitting the scan engine to execute the one or more scan operations on the asset is based on the schedule of the one or more network operations.

8. The method of claim 5, wherein the one or more events comprise at least one of a software installation, a patch installation, or a configuration change of the asset.

9. The method of claim 5, wherein receiving the request from the scan engine to execute the one or more scan operations on the asset comprises receiving a private certificate from the scan engine.

10. The method of claim 5, further comprising:
authenticating, by the scan assistant, the scan engine with the scan assistant to execute the one or more scan operations on the asset based on verifying that a private certificate and a public certificate held by the scan assistant are a matching public-private certificate pair.

11. The method of claim 10, wherein the scan assistant generates the public certificate for authenticating the scan engine with the scan assistant to execute the one or more scan operations in response to receiving the private certificate from the scan engine.

12. The method of claim 10, wherein:
the public certificate comprises a public key associated with a client; and
the private certificate comprises a private key associated with the client.

13. An apparatus for authenticated asset assessment, comprising:
a memory; and
a processor executing one or more electronic instructions stored in the memory, causes the processor to execute a scan assistant on an asset,
the scan assistant configured to:
detect one or more events associated with the asset, wherein the asset comprises at least one computing resource;
transmit an event message to a scan engine in response to detecting the one or more events, wherein the event message indicates a schedule of one or more operations associated with the asset;
receive a request from the scan engine, upon receiving the event message, to execute one or more scan operations on the asset and to determine a state of the asset;
permit the scan engine to execute the one or more scan operations on the asset; and
in response to said permitting, execute the one or more scan operations on the asset in cooperation with the scan engine.

14. The apparatus of claim 13, wherein the processor, when executing the one or more electronic instructions of the scan assistant stored in the memory, is further configured to:
determine, by the scan assistant, the schedule of one or more network operations associated with the asset.

15. The apparatus of claim 14, wherein permitting the scan engine to execute the one or more scan operations on the asset is based on the schedule of the one or more network operations.

16. The apparatus of claim 13, wherein the one or more events comprise at least one of a software installation, a patch installation, or a configuration change of the asset.

17. The apparatus of claim 13, wherein receiving the request from the scan engine to execute the one or more scan operations on the asset comprises receiving a private certificate from the scan engine.

18. The apparatus of claim 13, wherein the processor, when executing the one or more electronic instructions of the scan assistant stored in the memory, is further configured to:
authenticate the scan engine to execute the one or more scan operations on the asset based on verifying that a private certificate and a public certificate are a matching public-private certificate pair.

19. The apparatus of claim 18, wherein the public certificate for authenticating the scan engine with the scan assistant to execute the one or more scan operations is generated in response to a reception of the private certificate from the scan engine.

20. The apparatus of claim 18, wherein:
the public certificate comprises a public key associated with a client; and
the private certificate comprises a private key associated with the client.

\* \* \* \* \*